United States Patent
White et al.

(10) Patent No.: US 8,065,443 B1
(45) Date of Patent: Nov. 22, 2011

(54) COMPUTERIZED DEVICE FOR DATA COLLECTION AND COMMUNICATION

(75) Inventors: Ryan R. White, Ankeny, IA (US); Kraig Brody, Cedar Rapids, IA (US); William Woodburn, Muscatine, IA (US); Brad McDermott, Marion, IA (US); Chris Cleland, Cedar Rapids, IA (US); Brad Eckley, Ely, IA (US)

(73) Assignee: Intermec IP Corp, Beverly Hills, CA (US)

( * ) Notice: Subject to any disclaimer, the term of this patent is extended or adjusted under 35 U.S.C. 154(b) by 1037 days.

(21) Appl. No.: 11/439,535

(22) Filed: May 22, 2006

Related U.S. Application Data

(60) Provisional application No. 60/683,374, filed on May 20, 2005.

(51) Int. Cl.
G06F 3/00 (2006.01)
H02J 7/00 (2006.01)

(52) U.S. Cl. .............. 710/8; 710/15; 710/304; 320/106; 711/100; 713/300; 713/310; 713/320

(58) Field of Classification Search .................... None
See application file for complete search history.

(56) References Cited

U.S. PATENT DOCUMENTS

| | | | | |
|---|---|---|---|---|
| 5,592,069 A * | 1/1997 | Dias et al. | ...... | 320/106 |
| 5,739,596 A * | 4/1998 | Takizawa et al. | ...... | 307/66 |
| 5,809,518 A * | 9/1998 | Lee | ...... | 711/115 |
| 5,832,207 A * | 11/1998 | Little et al. | ...... | 726/36 |
| 5,862,354 A * | 1/1999 | Curiger et al. | ...... | 710/110 |
| 5,870,615 A * | 2/1999 | Bar-On et al. | ...... | 713/310 |
| 5,964,847 A * | 10/1999 | Booth et al. | ...... | 710/1 |
| 6,112,275 A * | 8/2000 | Curry et al. | ...... | 711/100 |
| 6,199,168 B1 * | 3/2001 | Miller | ...... | 713/300 |
| 6,567,864 B1 * | 5/2003 | Klein | ...... | 710/10 |
| 6,735,704 B1 * | 5/2004 | Butka et al. | ...... | 713/300 |
| 6,810,435 B2 * | 10/2004 | Palmer et al. | ...... | 710/8 |
| 6,862,637 B1 * | 3/2005 | Stupar | ...... | 710/104 |
| 7,039,742 B1 * | 5/2006 | Lada et al. | ...... | 710/301 |
| 7,099,970 B1 * | 8/2006 | Foegelle et al. | ...... | 710/110 |
| 7,181,557 B1 * | 2/2007 | Falik et al. | ...... | 710/110 |
| 7,317,297 B1 * | 1/2008 | Furlan et al. | ...... | 320/106 |
| 7,657,698 B2 * | 2/2010 | Hawkins | ...... | 711/103 |
| 2002/0117993 A1 * | 8/2002 | Dias et al. | ...... | 320/106 |
| 2004/0267974 A1 * | 12/2004 | Dunstan | ...... | 710/8 |
| 2005/0076088 A1 * | 4/2005 | Kee et al. | ...... | 709/206 |
| 2005/0111443 A1 * | 5/2005 | Herbert | ...... | 370/360 |
| 2005/0157568 A1 * | 7/2005 | Teicher | ...... | 365/195 |
| 2005/0248309 A1 * | 11/2005 | Denning | ...... | 320/106 |
| 2005/0251591 A1 * | 11/2005 | Hawkins | ...... | 710/10 |
| 2006/0008256 A1 * | 1/2006 | Khedouri et al. | ...... | 386/124 |
| 2007/0073420 A1 * | 3/2007 | Lanni | ...... | 700/22 |
| 2009/0249089 A1 * | 10/2009 | Tremel et al. | ...... | 713/300 |

OTHER PUBLICATIONS

Archive of Wikipedia '1-Wire' article from Jan. 11, 2005.*

* cited by examiner

*Primary Examiner* — Henry Tsai
*Assistant Examiner* — Steven Snyder
(74) *Attorney, Agent, or Firm* — Shook Hardy & Bacon LLP

(57) ABSTRACT

An improved computerized device and system for data collection and communication. The system can include component identification capability, multiple communication options, multiple optical reading and imaging options and multiple audio components. Further, the computerized can include a removable shock protection system. Multiple additional features and combinations of features are also disclosed.

5 Claims, 27 Drawing Sheets

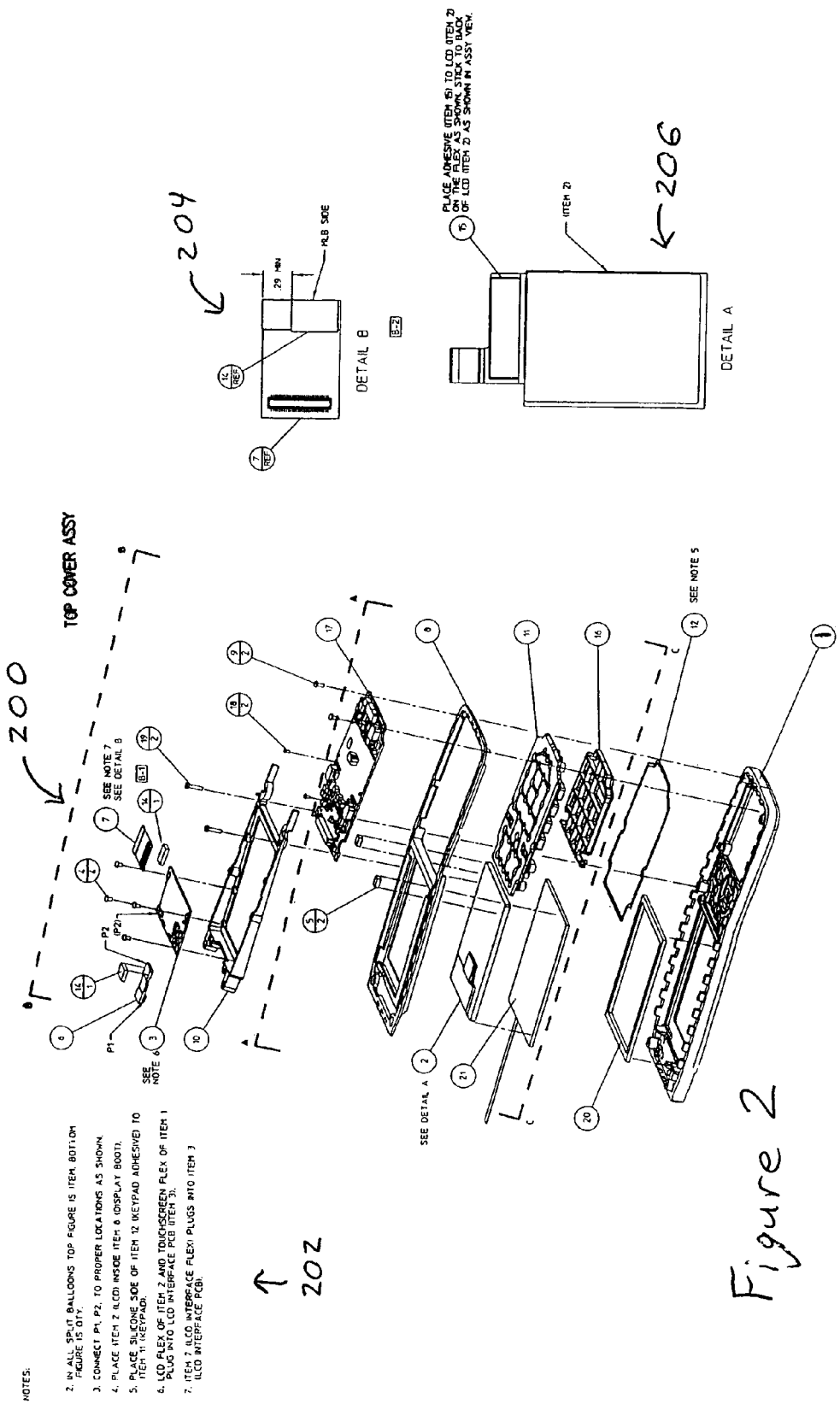

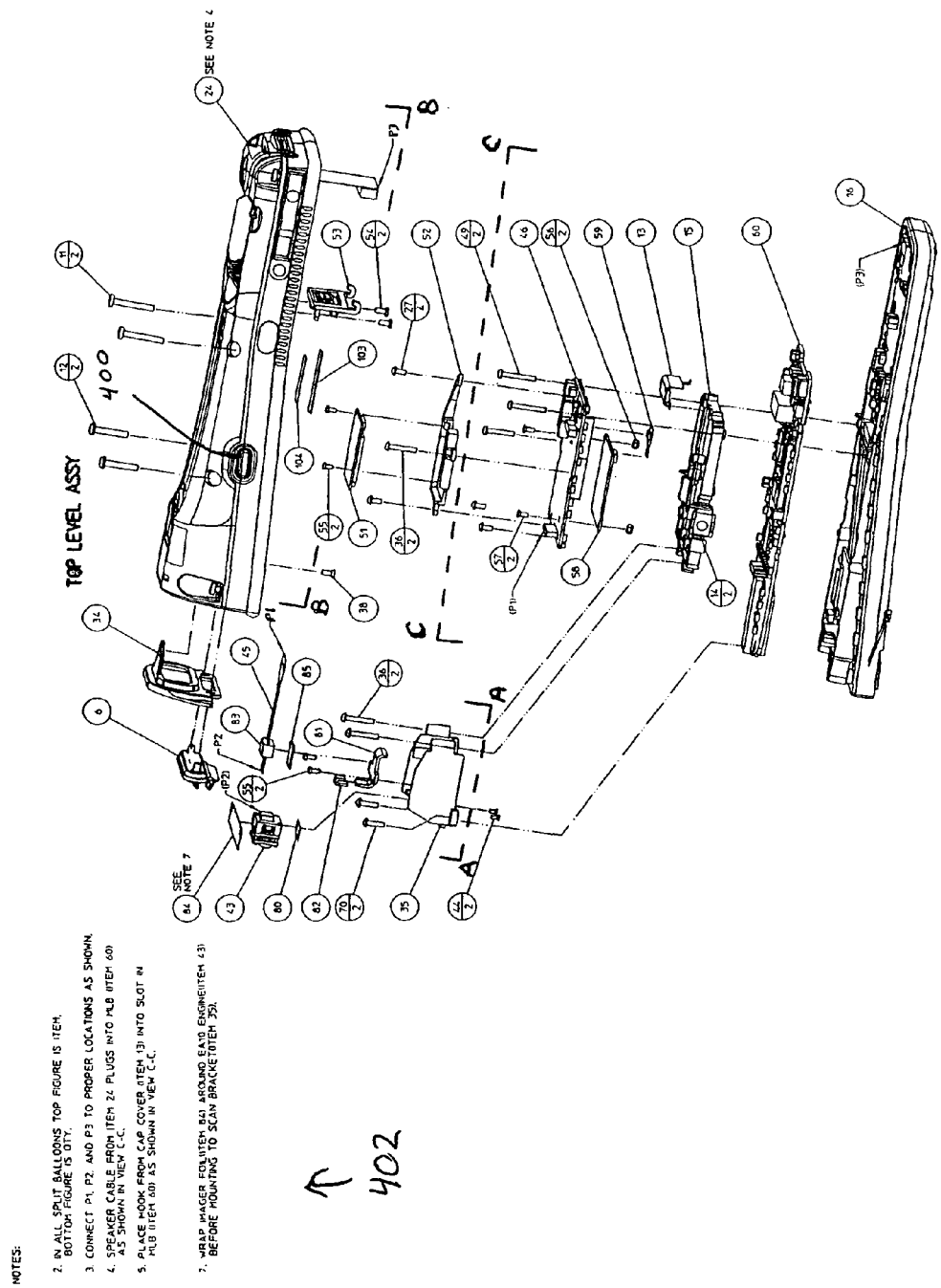

Item:
- #6  SD DOOR ASSEMBLY
- #15  MAGNESIUM, RADIO FRAME-MACHINED
- #34  BLANK WINDOW ASSEMBLY "OR" IMAGER WINDOW ASSY "OR" SCAN WINDOW ASSY
- #35  SCAN/IMAGER MOUNTING BRACKET, PLATED
- #46  RADIO OPTION PCB
- #51  GPRS SIEMENS MC 75 RADIO "OR" CDMA EM3420-P6HI-SPRINT RADIO
- #52  CDMA RADIO MOUNT "OR" GPRS RADIO MOUNT
- #53  SIM CARRIER ASSY (Note: SIM switch is located on side of battery compartment and is sealed.)
- #58  CUSTOM 802.11 A/B/G USB RADIO

Figure 5

| Item# | Material Description | QTY |
|---|---|---|
| | | 0 |
| 0001 | TETHERED STYLUS, | 1 |
| 0002 | TOP BUMPER, LEFT, OVERMOLD - | 1 |
| 0003 | TOP BUMPER, RIGHT, OVERMOLD - | 1 |
| 0004 | BOTTOM BUMPER, LEFT, OVERMOLD - | 1 |
| 0005 | BOTTOM BUMPER, RIGHT, OVERMOLD - | 1 |
| 0006 | SD Door Assy | 1 |
| 0007 | Handstrap | 1 |
| 0010 | screw, custom 6-32 x 1/4 cap head | 4 |
| 0011 | Cap Screw, #6-32x3/4 Torx Skt, Blk w/ny | 6 |
| 0012 | Screw, 4-40x5/8 PH Torx, Blk Steel w/Ny | 2 |
| 0013 | CAPACITOR COVER ASSY | 1 |
| 0014 | Scan Trigger assy bd | 2 |
| 0018 | LBL,POD,SERIAL/CERTIFICATION SET, | 1 |
| 0020 | Protective Cover | 1 |
| 0027 | SCREW, 2-56 X 3/16 PH, BLK SS W/NYLON | 3 |
| 0036 | Screw, 2-56 x 1/2 PH PD, SS W/Nylon | 4 |
| 0049 | SCREW, 2-56 X 5/8 PH, BLK SS W/NYLON | 2 |
| 0053 | SIM CARRIER, PLASTIC, | 1 |
| 0054 | SCR 2-28X3/16-PLASTIT | 2 |
| 0070 | SCREW, 2-56 X 5/16 PH, BLK SS W/NYLON | 1 |
| 0074 | LBL,CERTIFICATION, | 1 |
| 0100 | Mobile Computer QSG | 1 |
| 0101 | BAG,PLSTC,6.0X9.0X.004 | 1 |
| 0102 | BAG,POLYETHYLENE,6 X 15 X .002 | 1 |
| 0103 | 245 6X30 CIB Mndr | 1 |
| 0104 | tape, vhb double-sided | 1 |
| 0105 | LBL,PROD IDENTIFICATION SHIP | 1 |
| 0009 | Battery Pack | 1 |

Figure 7

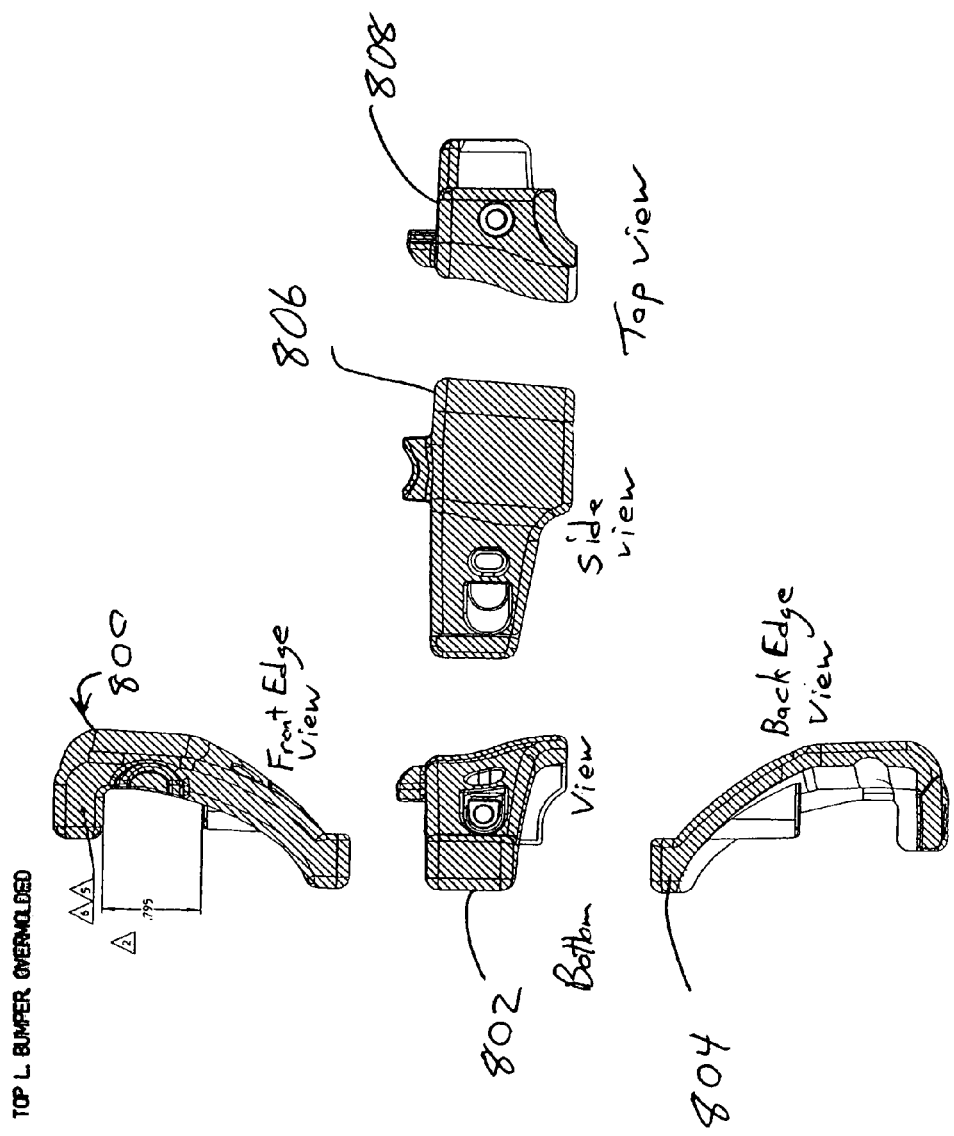

BOTTOM L.BUMPER, OVERMOLDED
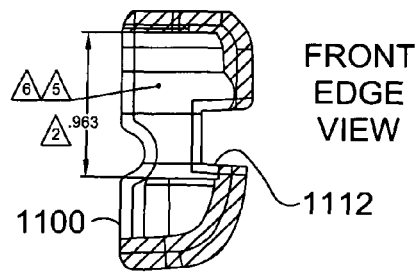
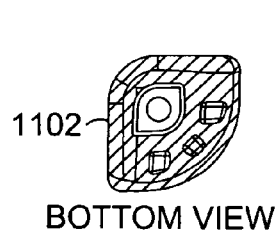
BOTTOM VIEW
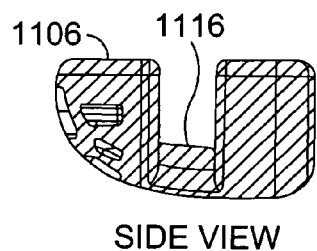
SIDE VIEW
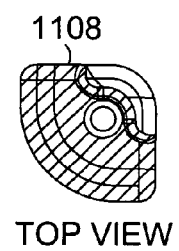
TOP VIEW
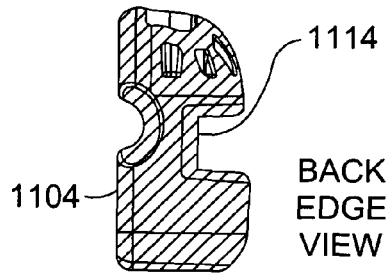
*FIG. 11.*

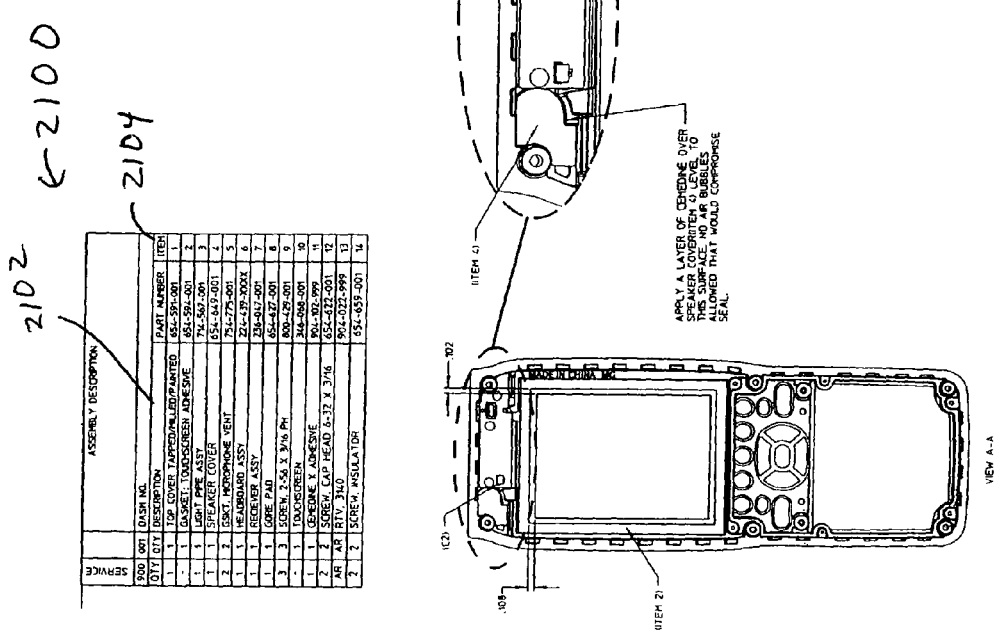
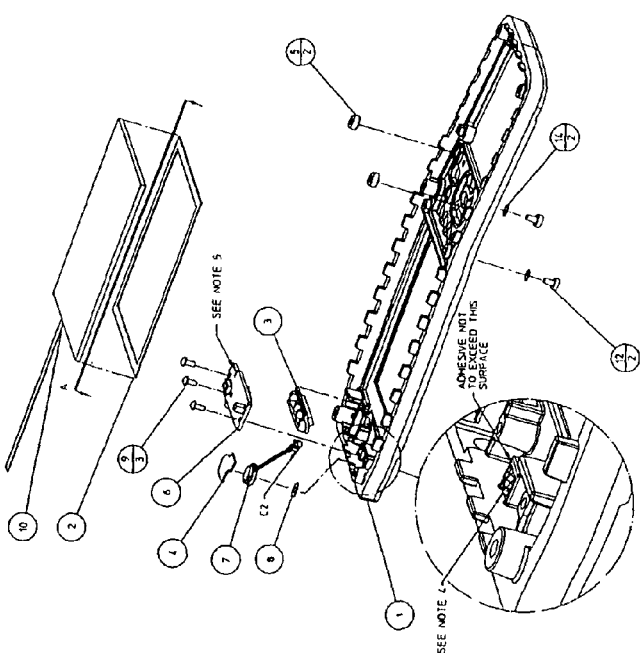
Figure 21

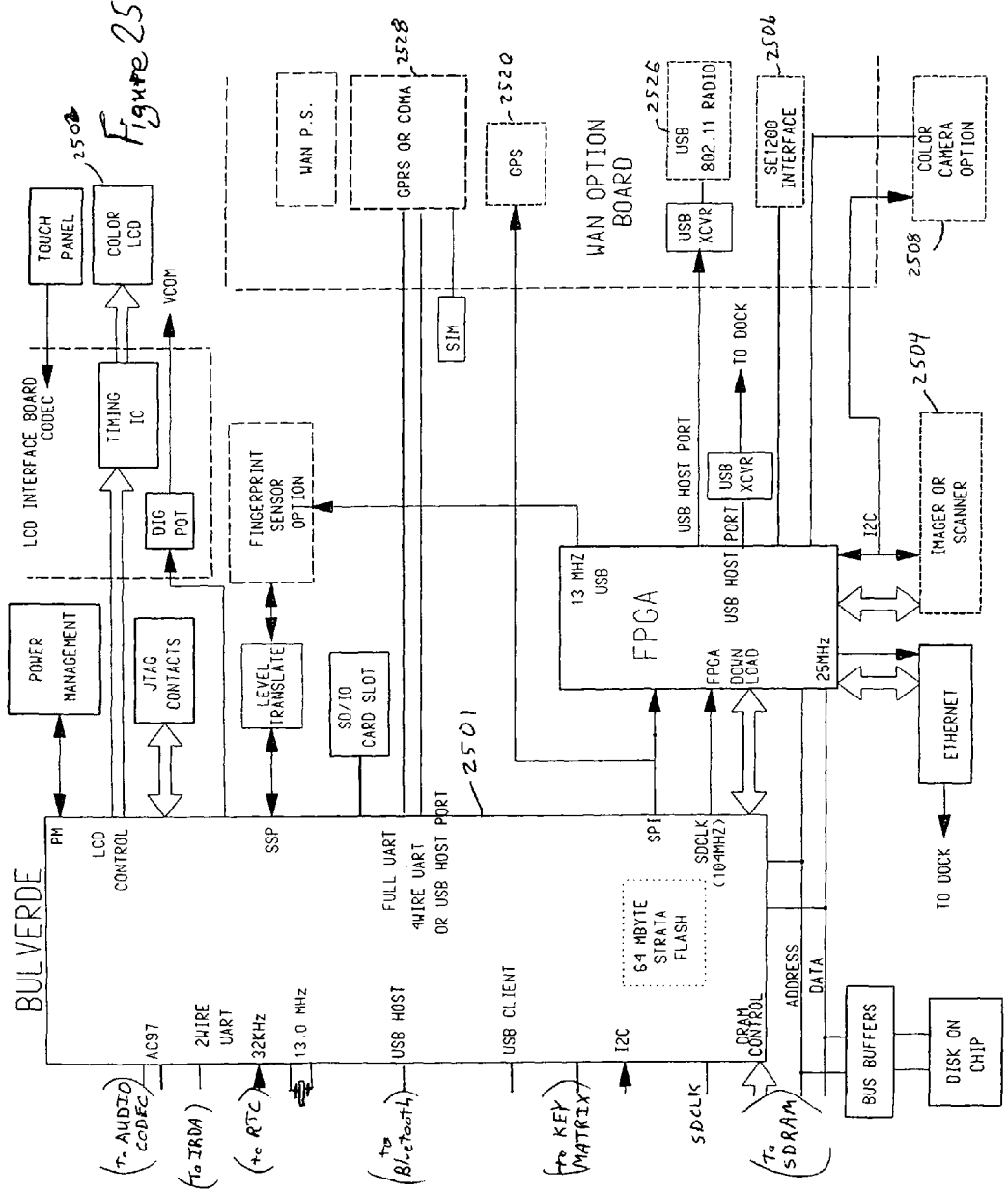

COMPUTERIZED DEVICE FOR DATA COLLECTION AND COMMUNICATION

CROSS REFERENCE TO RELATED APPLICATION AND INCORPORATION BY REFERENCE

This application claims the benefit of U.S. Provisional Application No. 60/683,374, filed May 20, 2005. The entire specification of U.S. Provisional Application No. 60/683,374, filed May 20, 2005, including all text, appendices and drawing figures is hereby incorporated herein by this reference.

OVERVIEW OF THE INVENTIONS

The following description presents several new inventions contained in a new data collection and communication apparatus. Some of the inventions are identified via the various headings interspersed throughout this specification. Other inventions, however, are disclosed though the text or drawing figures or both and are not specifically summarized by one of the various headings. Further, although some claims appear at the end of this document, the claims presented are not considered to be an exhaustive list of the inventions disclosed herein.

In general, the inventions are disclosed in relation to a portable computerized device. Some of the inventions, however, can be used in other settings. For example, some of the inventions can also be used in non-portable, or non-user supported, or non-ruggedized, or even in non-computerized devices.

More specifically, the particular context in which the inventions are described is a ruggedized, user-supportable computerized device. The computerized device shown throughout several of the figures can be considered to be a "pen-based" system in that it is capable of receiving information via the use of a stylus or via touch. It will be appreciated, however, that several of the disclosed inventions can be used with a device that does not support touch or stylus input of information. Further, the depicted computerized device includes a display screen for outputting information to a user. It will be appreciated, however, that several of the disclosed inventions can be used with a device that does not include a visual display component. The computerized device also includes a keypad for inputting information. It will be appreciated, however, that several of the disclosed inventions can be used with a device that does not include key-based input.

Further still, the depicted computerized device is battery-powered. It will be appreciated, however, that several of the disclosed inventions can be used with a device that does not include its own energy source. The primarily disclosed computerized device also includes flash memory based program storage as well as the capability of expanding information storage (for example, via the addition of an SD card). It will be appreciated, however, that several of the disclosed inventions can be used with a device that does not include these types of computer memory.

The computerized device also includes several communication options. It includes wireless and wired communication options. The wireless communication options include both short range and longer range radio communication capabilities. In addition, however, it can include wired RS-232 serial port and USB (client) connectivity. It will be appreciated, however, that several of the disclosed inventions can be used with a device that does not support any of these types of communication options. Further, several of the inventions can be used with a computerized device that contains no communication options at all.

BRIEF DESCRIPTION OF THE DRAWINGS

The invention may be more fully understood by reading the following description of the embodiments of the invention, in conjunction with the appended drawings, wherein:

FIG. 2 depicts an exploded view 200 of the top cover assembly for the computerized device such as that depicted in FIG. 1, including several internal components such as a magnesium display frame 10, FIG. 2, keypad components 11, 16, 17 FIG. 2, notes 202 and detail views of an LCD Flex Assembly, Detail B, 204 and an LCD Module, Detail A, 206.

FIG. 4 depicts an exploded view of a computerized device such as that depicted in FIG. 1, including several internal components such as a frontal assembly 16, FIG. 4 similar to the assembly depicted in FIG. 1, a main logic board 60, FIG. 4, and notes 402.

FIG. 5 depicts a listing 500 of several of the parts depicted in FIG. 4 and relating the listing to FIG. 4 via the designated item numbers 502.

FIG. 7 depicts a listing 700 of several of the parts depicted in FIG. 6 and relating the listing to FIG. 6 via the designated item numbers 702.

FIG. 8 depicts five views 800, 802, 804, 806, 808 related to a shock bumper to be located on a top-left corner of a computerized device.

FIG. 11 depicts five views 1100, 1102, 1104, 1106, 1108 related to a shock bumper to be located on a top-left corner of a computerized device.

FIG. 21 depicts features related to the assembly, sealing and structure of the top cover sub-assembly such as is also depicted in FIGS. 2, 4 and 6. FIG. 21 also depicts a table 2100 listing 2102 several of the parts depicted in FIG. 21 and relating the listing to FIG. 21 via the designated item numbers 2104.

FIGS. 25A and 25B present a block diagram depicting an embodiment of a main logic board for a computerized device such as is illustrated throughout this specification. The relationship between FIG. 25A and FIG. 25B is depicted 2500 on the left-hand side of FIG. 25A.

DETAILED DESCRIPTION OF THE EMBODIMENTS

Figure 1:
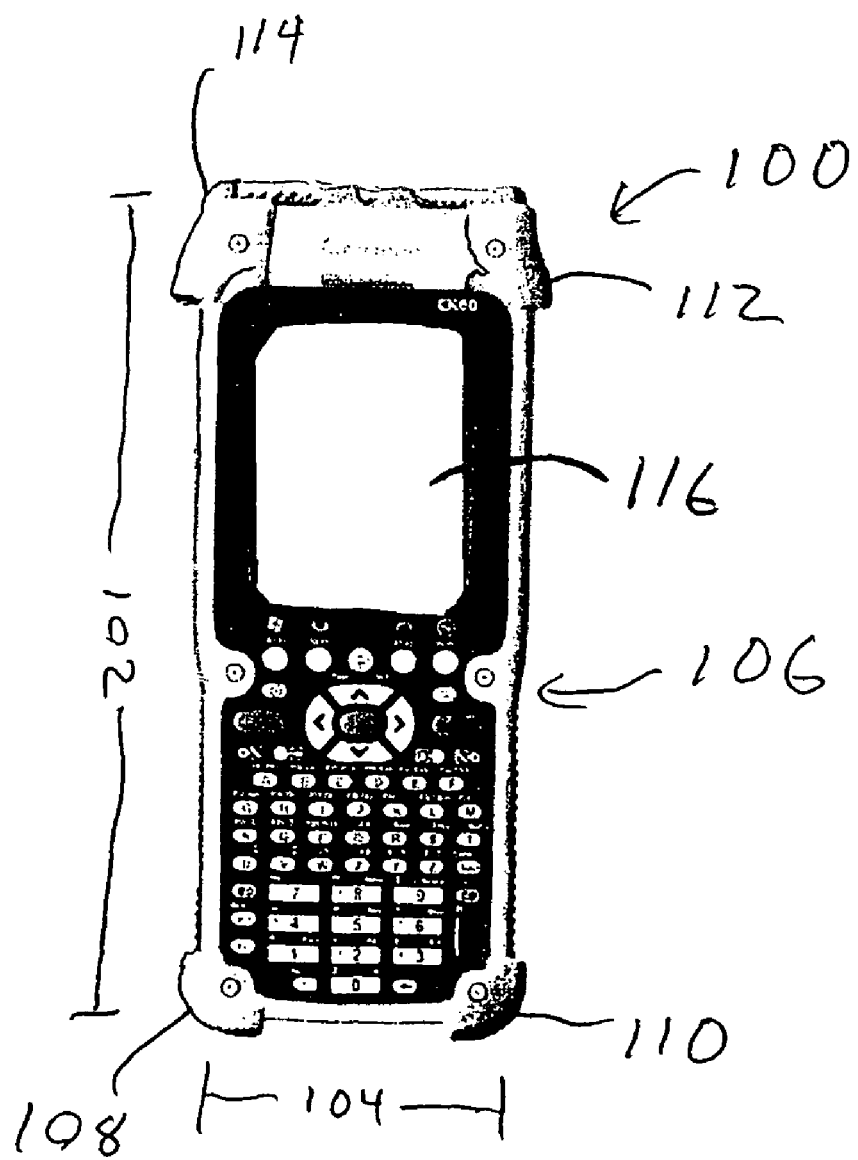
FIG. 1 depicts an exterior view of a portable computerized device having a display/touch screen, a keypad area, a housing, four corner shock bumpers as well as other features.

An illustration of one embodiment of the exterior of the computing device is presented in FIG. 1. The computing device 100, FIG. 1, is of a size and weight permitting it to be user-supported and hand-held. For example, its dimensions can be in the neighborhood of 8.9 inches (see 102, FIG. 1)×3.7 inches (see 104, FIG. 1)×2 inches (depth, not shown in FIG. 1). It can be shaped so that it is narrower in the handgrip area 106. For example, in embodiment depicted in FIG. 1, the handgrip area 106, FIG. 1, has width of 1.5 inches. By way of further example, the weight of the device can be made to fall within the 20 to 30 ounce range (depending on the particular configuration being weighed).

Several components can be added to the computing device to make it more convenient to use. A user-replaceable handstrap can be added to the back of the device. A scan or reading handle can be added to make it easier to aim at information being captured. A holster can be body-mounted to carry the unit when it is not hand-held. Further, a holster specifically designed for use with a device having a handle can be used if desired. In addition, the device can include a tether to attach the stylus of device having stylus input to computing device. This can prevent the loss of the stylus and ensure that it is with the device when needed for input. In addition, the computerized device can be fitted with a screen protector or a protective boot to provide added protection to the screen (if present) or to an end of the device.

The computerized device can be made sufficiently rugged to withstand anticipated drops, tumbles, vibration and shock. For example, the device can be designed to withstand drops of five to six feet. In addition, it can be sealed to dust, rain and to the pooling of water on the display screen. Further, it can be designed to withstand storage temperatures of −4 degrees to 158 degrees Fahrenheit, operating temperatures of −4 degrees to 122 degrees Fahrenheit and relative humidity of 95 percent.

Other features of the computerized device are illustrated throughout the accompanying drawing figures and also in accompanying Appendix A, Appendix B and Appendix C. Appendix A presents a description of several features of a family of computerized devices that is related to the computerized device depicted in FIG. 1 and in several of the other figures. Appendix B presents a summary of several features of a family of computerized devices that is related to the computerized device depicted in FIG. 1 and in several of the other figures. Appendix C presents a description of several features of a family of computerized devices that is related to the computerized device depicted in FIG. 1 and in several of the other figures. The entire content of Appendix A, consisting of pages A1 through A17, is incorporated herein in its entirety by this reference. In addition, the entire content of Appendix B, consisting of pages B1 through B2, is incorporated herein in its entirety by this reference. In addition, the entire content of Appendix C, consisting of pages C1 through C22, is incorporated herein in its entirety by this reference.

FIG. 2 depicts components that can be included in a top cover assembly for a computerized device such as that depicted in FIG. 1. FIG. 3 presents a table listing 300 several of the parts depicted in FIG. 2 and relating the listing to FIG. 2 via the designated item numbers 302. The item numbers 302 of FIG. 3 refer to the reference numerals appearing in FIG. 2.

External Housing

The external housing for the computerized device also includes several features. First, the top cover 1, FIG. 2, of the external housing can be made of magnesium. This provides several advantages. For example, it permits the size (the thickness) of the case to be smaller. This helps the computerized device to have a smaller overall size. Another way to look at this is that it can increase the space available for internal components (since the housing is thinner and therefore takes up less of the internal space itself). The magnesium housing 1, FIG. 2, also provides a strong outer shell that is less likely to break and that gives the internal components greater protection from shock. In addition, the magnesium cover 1, FIG. 2, improves the sealing of the computerized device to humidity and liquids.

Due to the structure of the customizable keypad component (described below) and the static exterior features (touch screen/display, non-customizable keypad regions)(also described below), the same magnesium top cover 1, FIG. 2, can be used with all configurations of the computerized device. This promotes ease of assembly, lowers the cost of the device and facilitates reconstruction or repair of the housing when necessary. The top cover 1, FIG. 2, can alternatively be made from other materials or metals. Especially suitable are metals having a high strength to weight ratio.

FIG. 4 depicts an exploded view of a computerized device such as that depicted in FIGS. 1 and 2, including several internal components such as a frontal assembly 16, FIG. 4 similar to the assembly depicted in FIG. 1, a main logic board 60, FIG. 4, and notes 402. FIG. 5 presents a table listing 500 several of the parts depicted in FIG. 4 and relating the listing to FIG. 4 via the designated item numbers 502. The item numbers 502 of FIG. 5 refer to the reference numerals appearing in FIG. 4.

The bottom external housing cover 24, FIG. 4, can be made from magnesium or from a material that is different from that of the top cover 1, FIG. 2. For example, in one embodiment the bottom cover 24, FIG. 4, is made of plastic and the top cover 1, FIG. 2, is made of magnesium. Other combinations of materials are also possible. Like the top cover, the bottom cover can alternatively be made from other materials or metals. Especially suitable are metals having a high strength to weight ratio.

Corner-Mounted Removable Shock Protection

Figure 6:
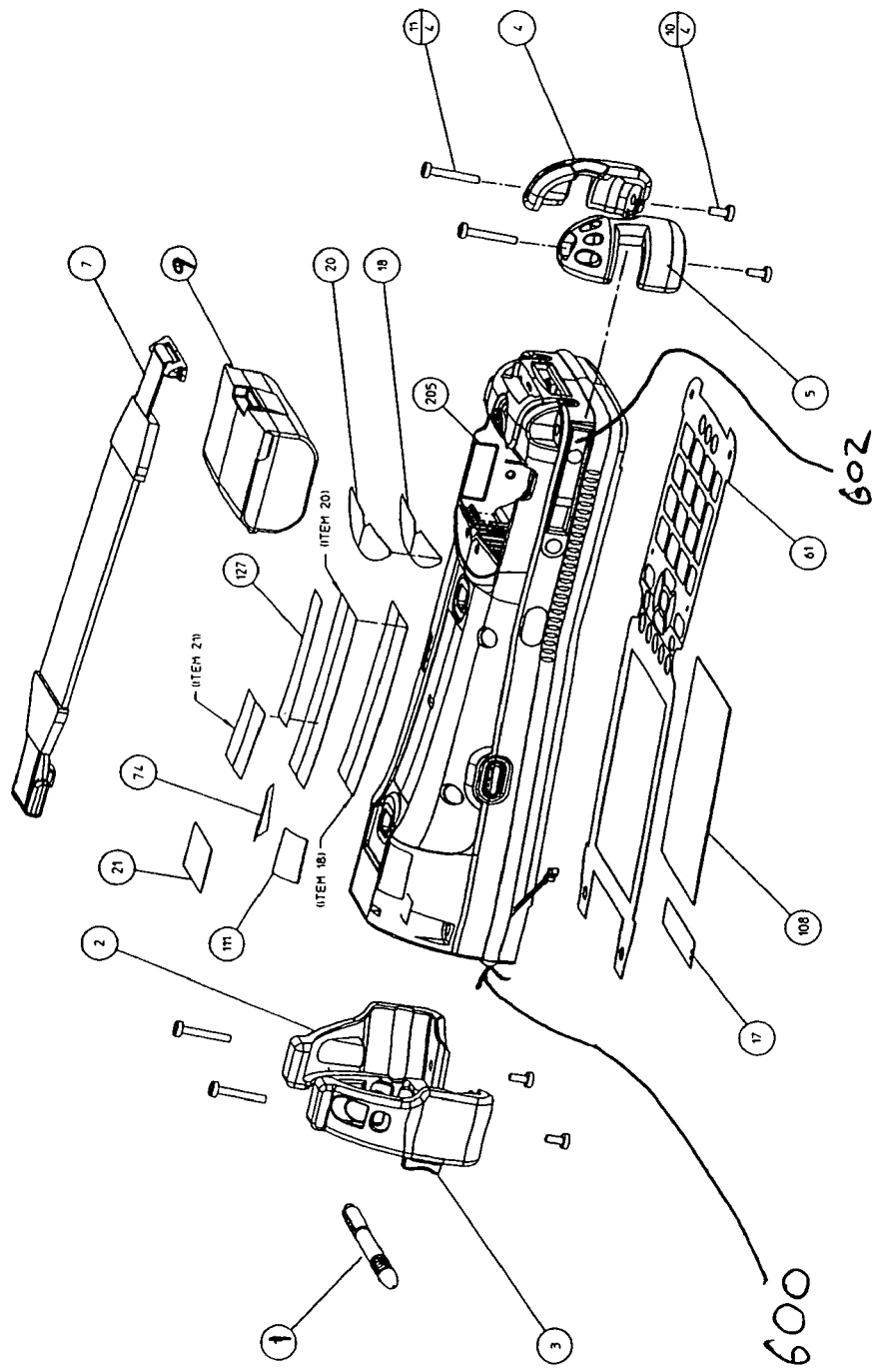
FIG. 6 depicts an exploded view of a computerized device 600 such as that depicted in FIG. 4, including several externally located components such as corner bumpers, a handstrap 7, FIG. 6, a battery pack 9, FIG. 6, and a stylus 1, FIG. 6, and similar to the assembly depicted in FIG. 1.

FIG. 6 depicts an exploded view of a computerized device 600 such as that depicted in FIGS. 1, 2 and 4, including several externally located components such as corner bumpers 2, 3, 4, 5, FIG. 6, a handstrap 7, FIG. 6, a battery pack 9, FIG. 6, and a stylus 1, FIG. 6. FIG. 7 presents a table listing 700 several of the parts depicted in FIG. 6 and relating the listing to FIG. 6 via the designated item numbers 702. The item numbers 702 of FIG. 7 refer to the reference numerals appearing in FIG. 6. Generally, the removable shock protection feature of the computerized device can provide enhanced drop and shock protection to a hand-held or portable device, for example a device such as the computerized device referred to herein. It can, however, also be used with other types of apparatus.

Figure 9:
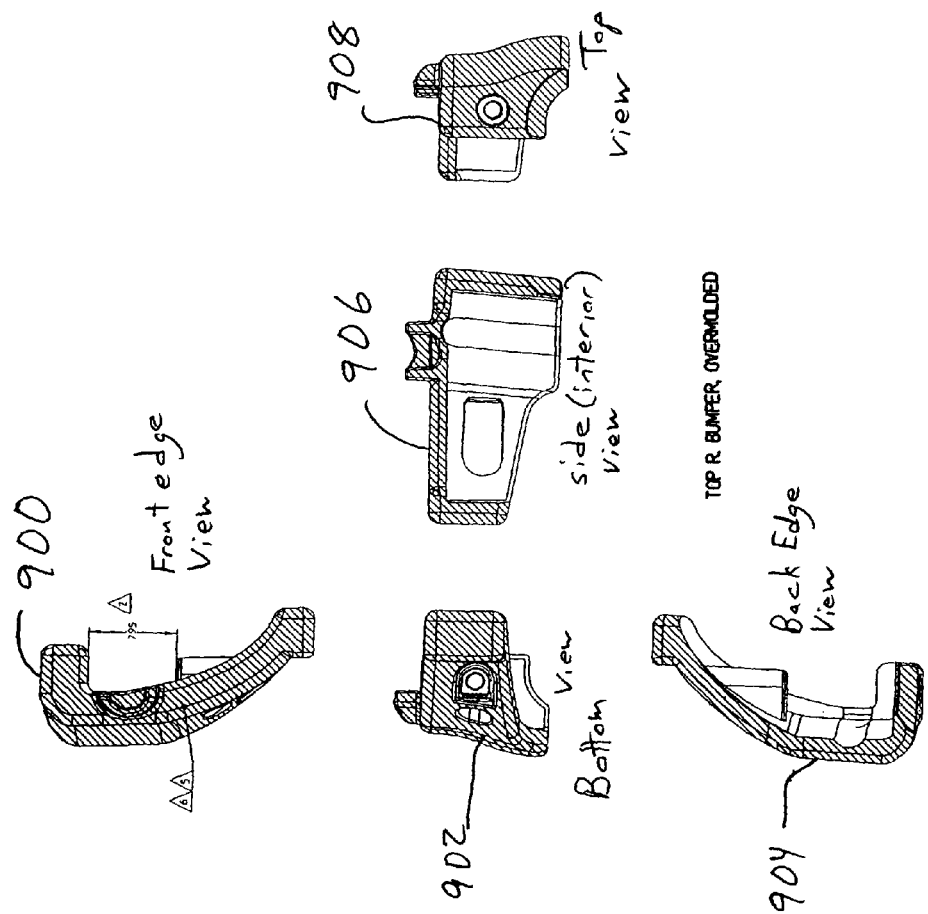
FIG. 9 depicts five views 900, 902, 904, 906, 908 related to a shock bumper to be located on a top-left corner of a computerized device.
Figure 10:
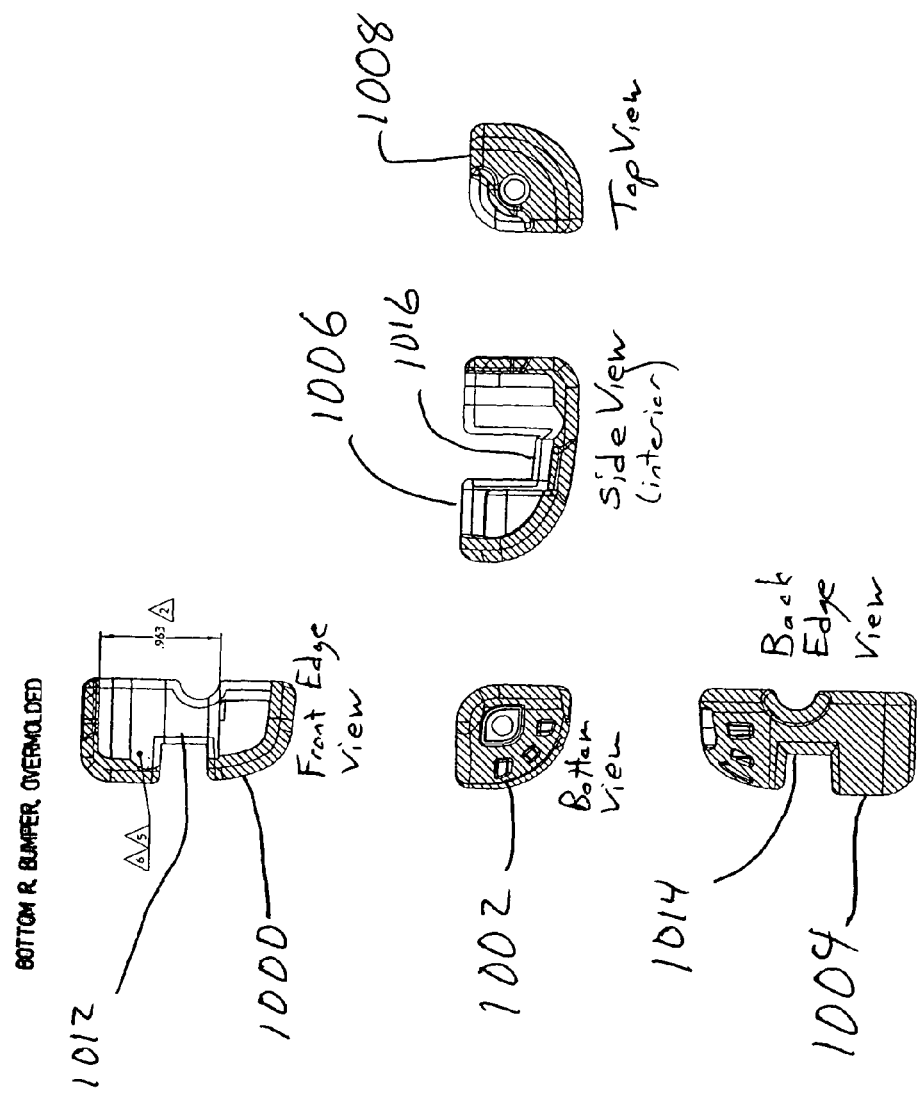
FIG. 10 depicts five views 1000, 1002, 1004, 1006, 1008 related to a shock bumper to be located on a top-left corner of a computerized device.

The removable shock protection invention involves removable pieces (herein referred to as "bumpers") that can be coupled with the perimeter of the device requiring protection. One embodiment of a suitable bumper system, customized for the family of computerized devices represented by FIG. 1, is depicted in FIG. 1 (see 108, 110, 112, 114, FIG. 1), 6, and 8-11. FIG. 8 depicts five views 800, 802, 804, 806, 808 of the top, left bumper 2, FIG. 6, depicted in FIG. 6. FIG. 9 depicts five views 900, 902, 904, 906, 908 of the top, right bumper 3, FIG. 6, depicted in FIG. 6. FIG. 10 depicts five views 1000, 1002, 1004, 1006, 1008 of the bottom, right bumper 5, FIG. 6, depicted in FIG. 6. FIG. 11 depicts five views 1100, 1102, 1104, 1106, 1108 of the bottom, left bumper 4, FIG. 6, depicted in FIG. 6.

Further, as shown in FIG. 6, a stylus 1, FIG. 6, can be held between the two top bumpers 2, 3, FIG. 6, and FIG. 8, FIG. 9, for transport and storage. In addition, the bottom two bumpers 4, 5, FIG. 6; FIG. 10, FIG. 11, can be designed to facilitate docking of the unit with the bumpers in place. The design also facilitates coupling of the computerized device with various snap-on adapters described in greater detail below.

The bumpers can be positioned at or near the corners of the unit (as shown) for example. The bumpers can alternatively be designed to wrap around the entire depth of the unit. When a unit equipped with the bumpers is dropped, for example, the impact force will be received first by the bumper. The bumper will then dissipate the impact force and the more sensitive components of the unit (for example, a display screen or other electronic component) will be protected from damage. The shock bumpers are positioned on the corners of the computerized device in the depicted embodiment because such a location will provide adequate protection to the entire unit after most falls, while permitting the mid-section of the device to be of a size conveniently held by a user's hand.

When the bumpers show signs of wear, they can be readily replaced. Not only will the unit benefit from fresh shock protectors, but the appearance of the unit will also be enhanced. Further, portable data collection units often are designed to be coupled with a dock, hand grip, body-mounted holster or holder, or some type of optional or removable component (such as an optical reader, RFID transceiver, radio, etc.). If necessary, the bumpers of the present invention can be removed to facilitate such couplings. If non-removable shock protection was used, the shape of nearly every dock or other coupling component would have to be adapted to accommodate the shape of the shock protection. However, as discussed herein, docks and adapters can be designed that will cooperate with attached removable bumpers so that the removable bumpers will not have to be removed prior to docking. Such an arrangement provides ultimate flexibility while retaining ease of use.

The removability and replaceability of the shock protection is a unique and very useful feature. It permits one to preserve a newer appearance for the unit. It also permits ready replacement of all or a portion of the shock protection if it becomes damaged or it has deteriorated. Further, the removability of the bumpers can permit the shock protection to be customized to meet the demands of the particular application at hand. For example, in certain applications and environments it may be advantageous to have thicker or more absorbent bumpers than in other applications and environments. Thus, the protection can be customized to meet the particular needs of the user.

To replace a shock protector, a user simply removes the two screws that attach it to the housing. The shock protectors can be made out of a Thermal Plastic Urethane material. Other materials, such as rubbers or overmold materials capable of absorbing impacts can alternatively be used.

Often, the same portable computerized device (such as that depicted in FIGS. 1, 2, 4, 6 and throughout this specification) will be used in a variety of different environments and applications. For example, in a single morning, a device used for an inventory or delivery application may be used in a walk-in freezer or refrigerator and then in a hot industrial or warehouse environment. Usage may alternate between hand-held, body-mount, vehicle-mount, table and dock locations. In addition, the same terminal may be used for a variety of applications. One moment it may be used to take inventory, then it may be used to collect a signature, or to read a bar code or RFID tag, or it may be docked to a printer to print or to a communications or recharging dock, or it may be used as a telephone or radio, and it may be placed in a body-mounted dock or holster wherein it can communicate with a wireless network or act as a loudspeaker.

As a computerized device encounters the various combinations of environments and applications suggested above, it may be advantageous or disadvantageous to have shock bumpers attached to the terminal. When the shock-protection is easily removable, the assembly can be readily modified to meet the needs of the specific situation. The following is a summary of some of the considerations that may come into play. Factors such as the particular design and layout of the terminal, the particular shape and size of the removable bumpers and the location of the bumpers on the terminal, can play a significant role in determining whether the bumpers should be attached or removed for a given environment and application.

Figure 12:
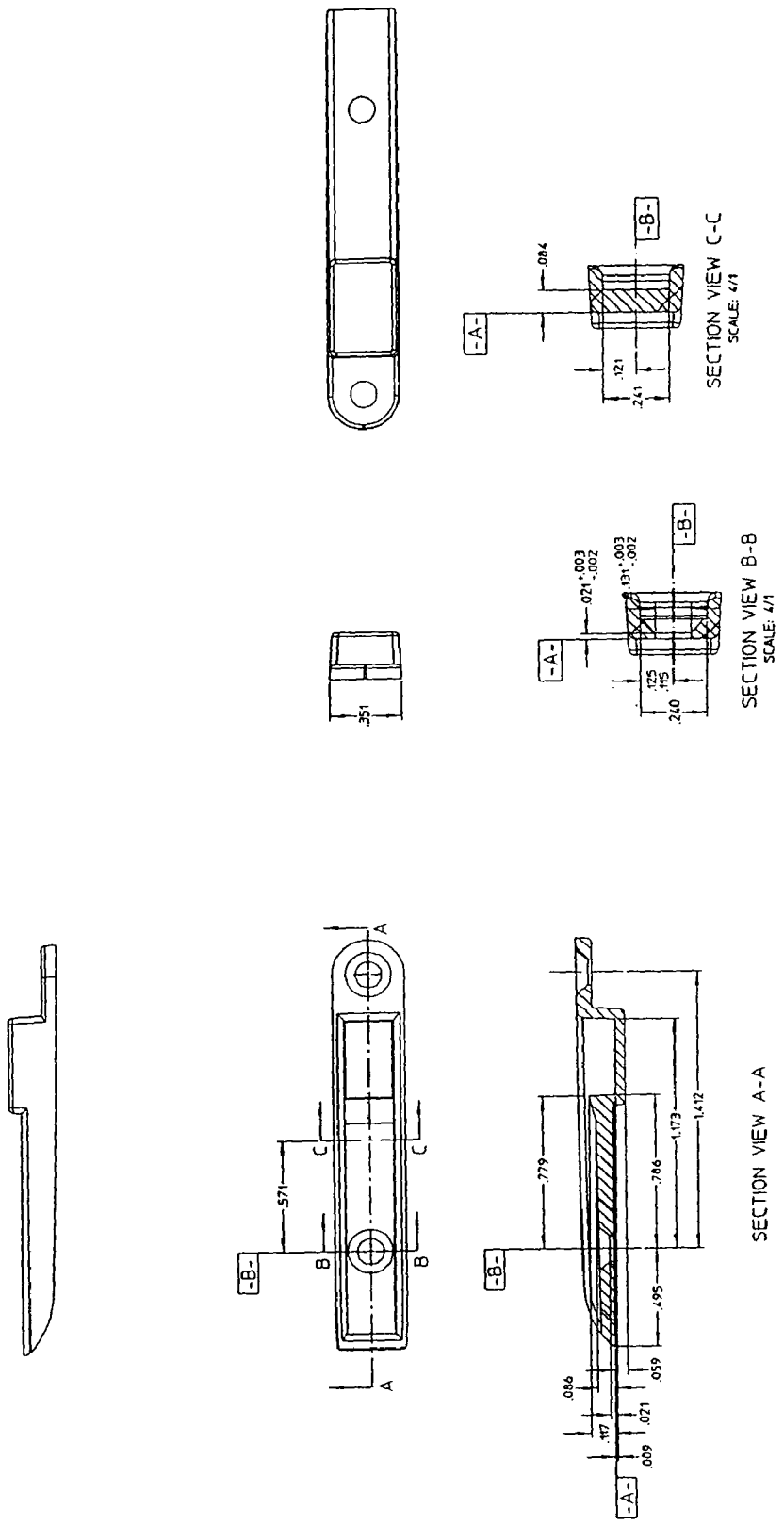
FIG. 12 depicts guide rail component structures for use on a computerized device having shock bumpers as illustrated in FIGS. 8-11.
Figure 13:
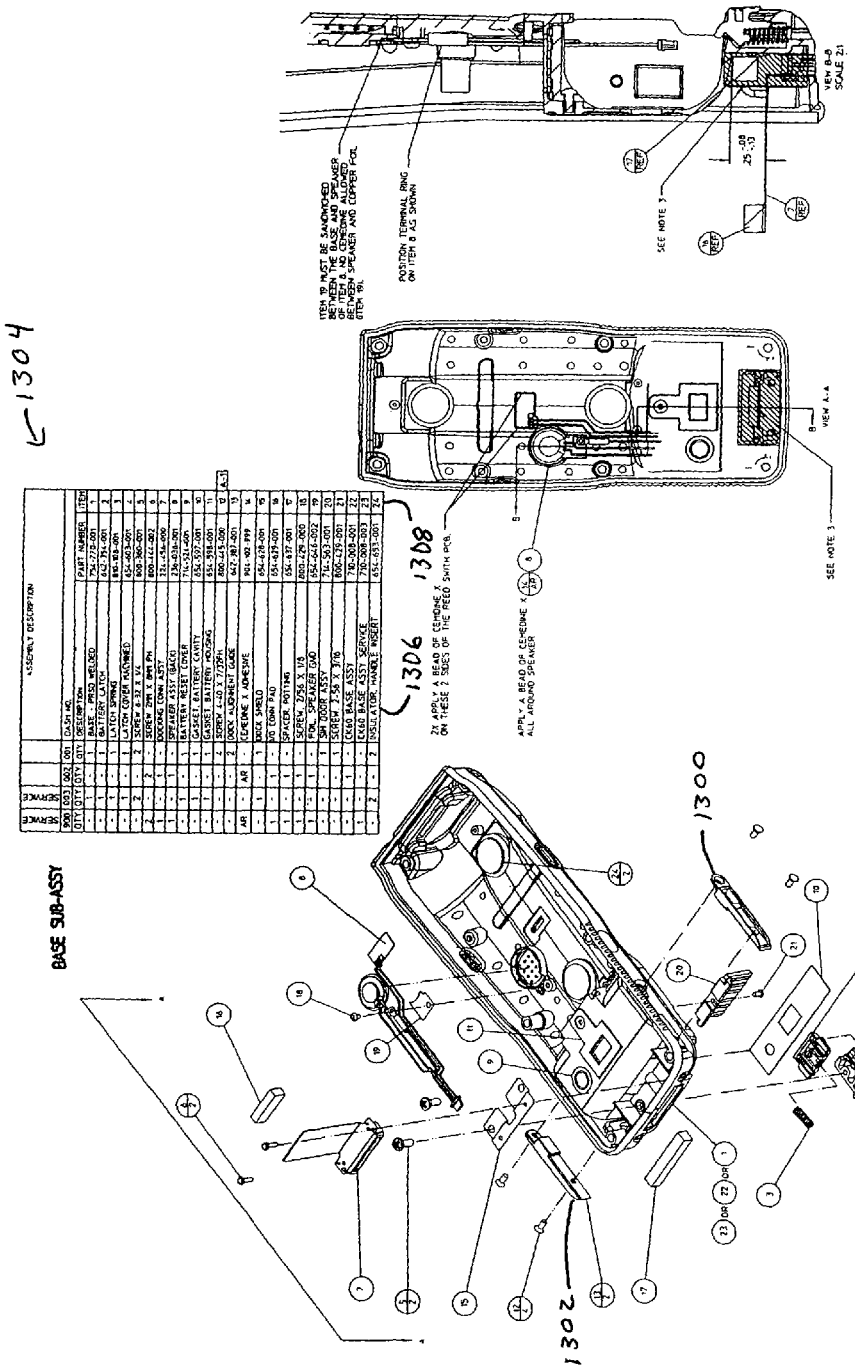
FIG. 13 depicts three views related to a base sub-assembly for a computerized device such as in depicted in FIGS. 1, 4 and 6.
Figure 14:
FIG. 14 depicts a listing 1400 of several of the parts depicted in FIG. 13 and relating the listing to FIG. 13 via the designated item numbers 1402.

A docking system can be designed with features permitting computerized device to be docked with its bumpers still attached. For example, there is a guide rail 602, FIG. 6; FIG. 12; 13, FIG. 13, on two of the opposite side surfaces of the computerized device. The guide rails 602, FIG. 6, FIG. 12; 13, FIG. 13, are positioned to provide guiding and locking for docking. The guide rails 602, FIG. 6, FIG. 12; 13, FIG. 13, can also provide guiding and locking for the attachment of snap-on adapters to the computerized device. The guide rails can be made, for example, from diecast aluminum or other suitable material and can be attached to the housing as depicted 1300, 1302, FIG. 13. FIG. 13 also includes a table 1304 listing 1306 several of the parts depicted in FIG. 13 and relating the listing to the components of FIG. 13 via the designated item numbers 1308. In addition, FIG. 14, presents a table listing 1400 several of the parts depicted in FIG. 13 and relating the listing to FIG. 13 via the designated item numbers 1402. The item numbers 1402 of FIG. 14 refer to the reference numerals appearing in FIG. 13.

The guide rails 602, FIG. 6, FIG. 12; 13, FIG. 13, are used to dock or couple the unit. The corner-mounted shock bumpers (FIG. 10, FIG. 11) need to clear the docking devices of the dock or snap-on adapter because the bumpers do not slide well against other surfaces. As a result, the use of the guide rails 602, FIG. 6, FIG. 12; 13, FIG. 13, provides a clean and consistent surface for the dock or snap-on connector to slide and lock on. For example, the bottom bumpers, which are the bumpers near the docking connector, have a slot 1012, 1014, 1016, FIG. 10; 1112, 1114, 1116, FIG. 11, that cooperates with a rail 602, FIG. 6, FIG. 12; 13, FIG. 13, in the computerized device's housing to permit the device to be coupled with a dock or a snap-on adapter.

The snap-on adapters that can also interface with the guide rails 602, FIG. 6; FIG. 12; 13, FIG. 13 can include devices such as a serial port, GPS radio, modem, magnetic strip reader, smart card reader, external speaker, or any other type of adapter device required by a user.

Figure 15:
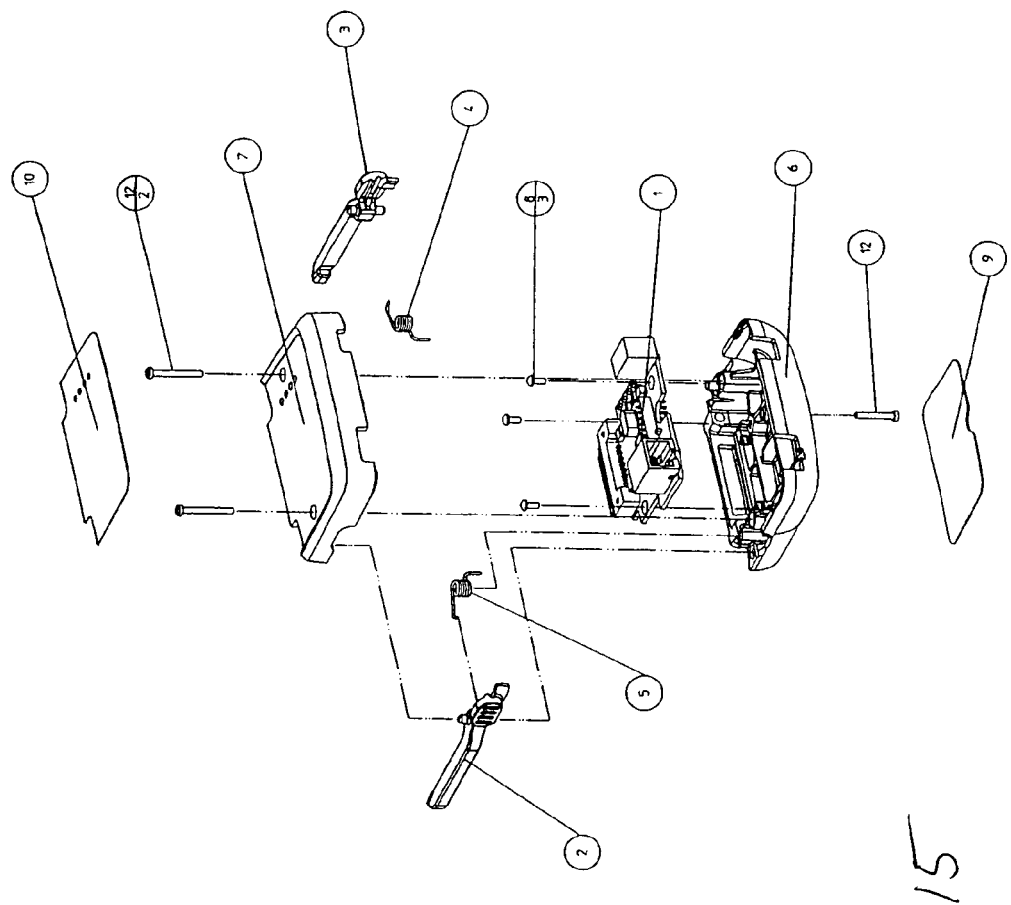
FIG. 15 depicts a snap-on modem adapter.

For example, FIG. 15 depicts an exploded view of a snap-on modem adapter. Two arms 2, 3, FIG. 15 cooperate with the guide rails 602, FIG. 6, FIG. 12; 13, FIG. 13 disclosed above and with springs 4, 5, FIG. 15 to couple the snap-on adapter with a computerized device. FIG. 15 also depicts the housing portions 6, 7, FIG. 15 and the modem component 1, FIG. 15 of the snap-on adapter.

Figure 16:
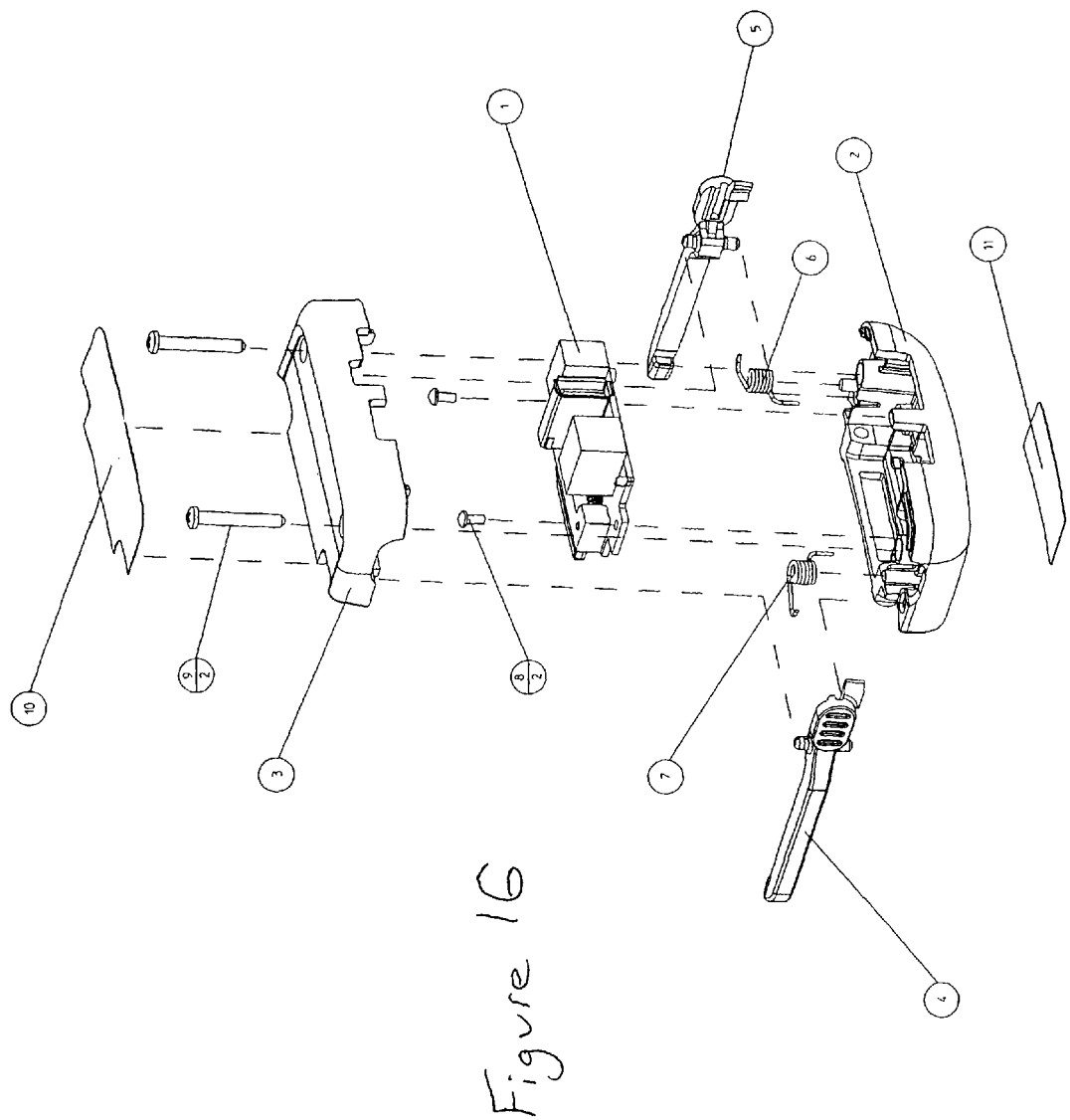
FIG. 16 depicts a snap-on USB adapter.

FIG. 16 depicts an exploded view of a snap-on USB adapter. Two arms 4, 5, FIG. 16 cooperate with the guide rails 602, FIG. 6, FIG. 12; 13, FIG. 13 disclosed above and with springs 6, 7, FIG. 16 to couple the snap-on adapter with a computerized device. FIG. 16 also depicts the housing portions 2, 3, FIG. 16 and the USB component 1, FIG. 16 of the snap-on adapter.

Figure 17:
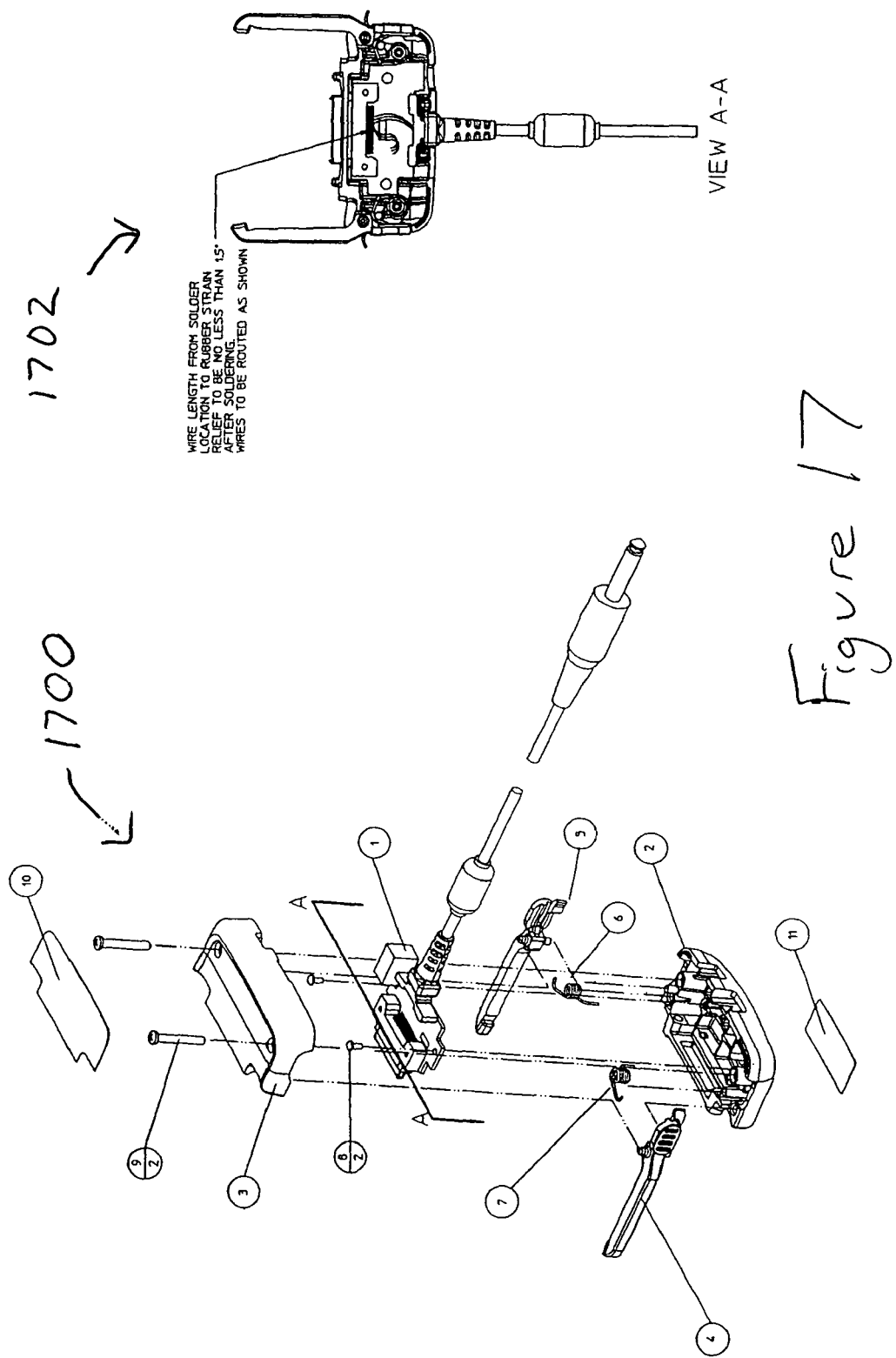
FIG. 17 depicts a snap-on DEX adapter.

FIG. 17 depicts an exploded view 1700 of a snap-on DEX adapter. FIG. 17 also depicts a top view 1702, as seen along plane A-A of the exploded view 1700, of the assembled snap-on DEX adapter. Two arms 4, 5, FIG. 17 cooperate with the guide rails 602, FIG. 6, FIG. 12; 13, FIG. 13 disclosed above and with springs 6, 7, FIG. 17 to couple the snap-on adapter with a computerized device. FIG. 17 also depicts the housing portions 2, 3, FIG. 17 and the DEX component 1, FIG. 17 of the snap-on adapter.

Figure 18:
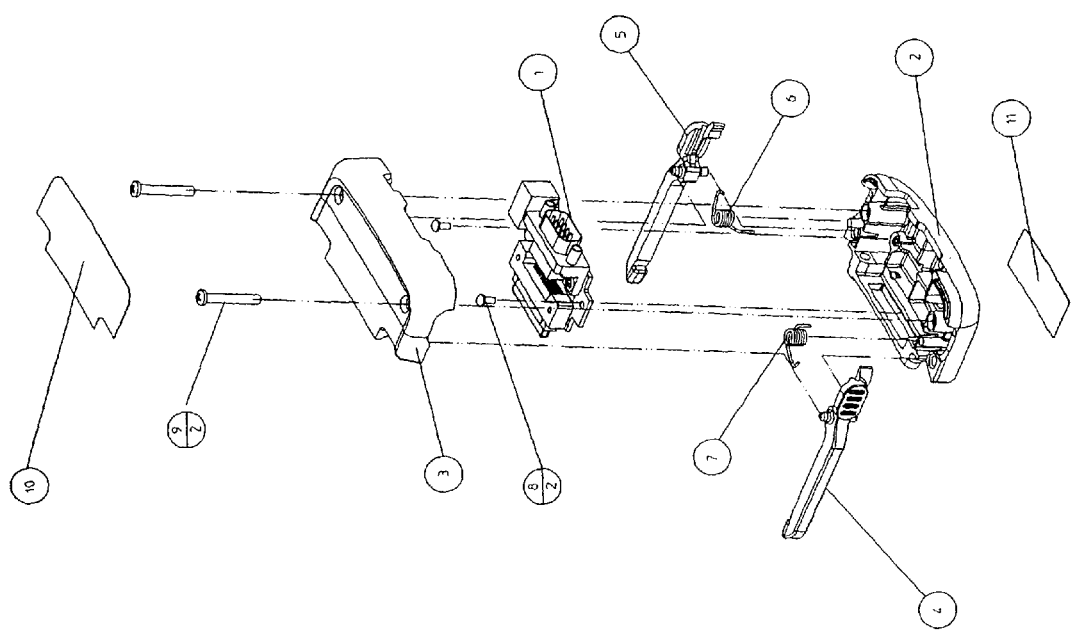
FIG. 18 depicts a snap-on RS-232 adapter.

FIG. 18 depicts a snap-on RS-232 adapter. Two arms 4, 5, FIG. 18 cooperate with the guide rails 602, FIG. 6, FIG. 12; 13, FIG. 13 disclosed above and with springs 6, 7, FIG. 18 to couple the snap-on adapter with a computerized device. FIG. 18 also depicts the housing portions 2, 3, FIG. 18 and the RS-232 component 1, FIG. 18 of the snap-on adapter.

Versatile Reading Window System

Figure 19:
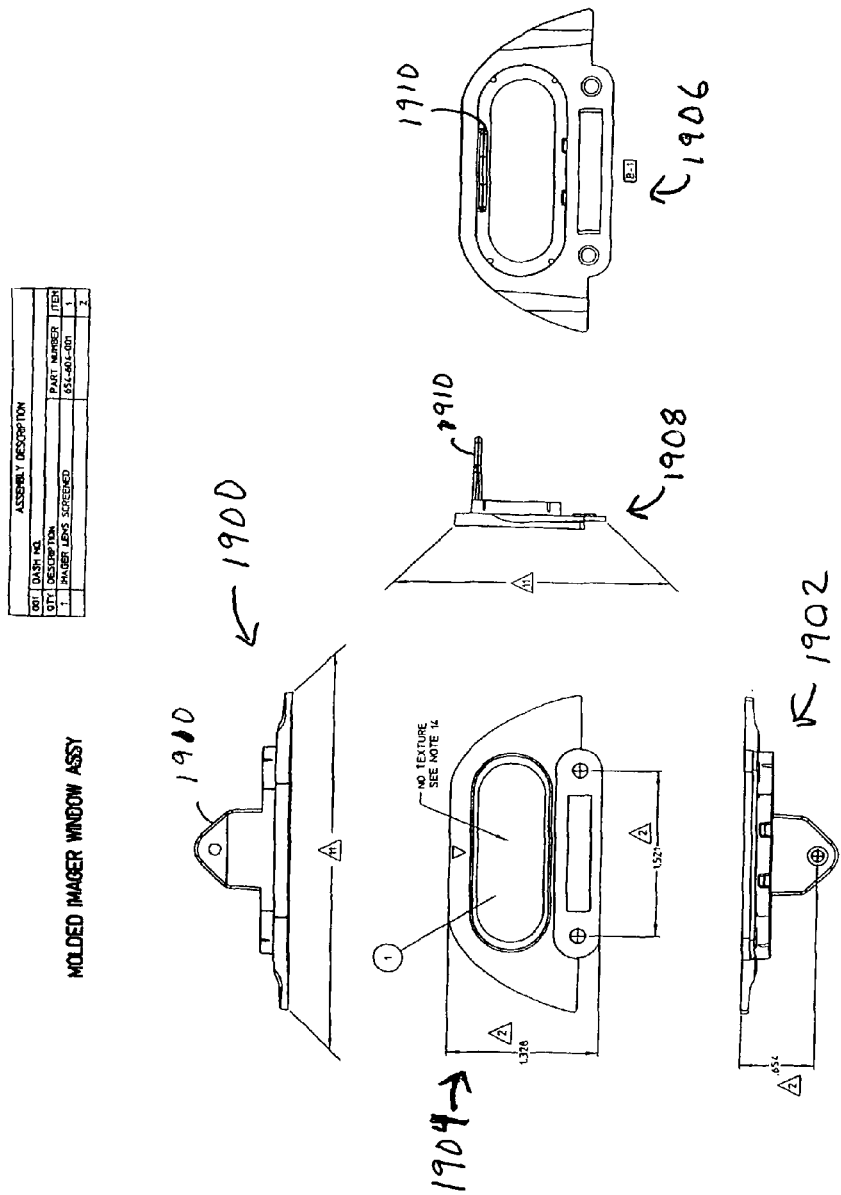
FIG. 19 depicts top, bottom, front, back and side views of a versatile window assembly for a device having an optical area imager.
Figure 20:
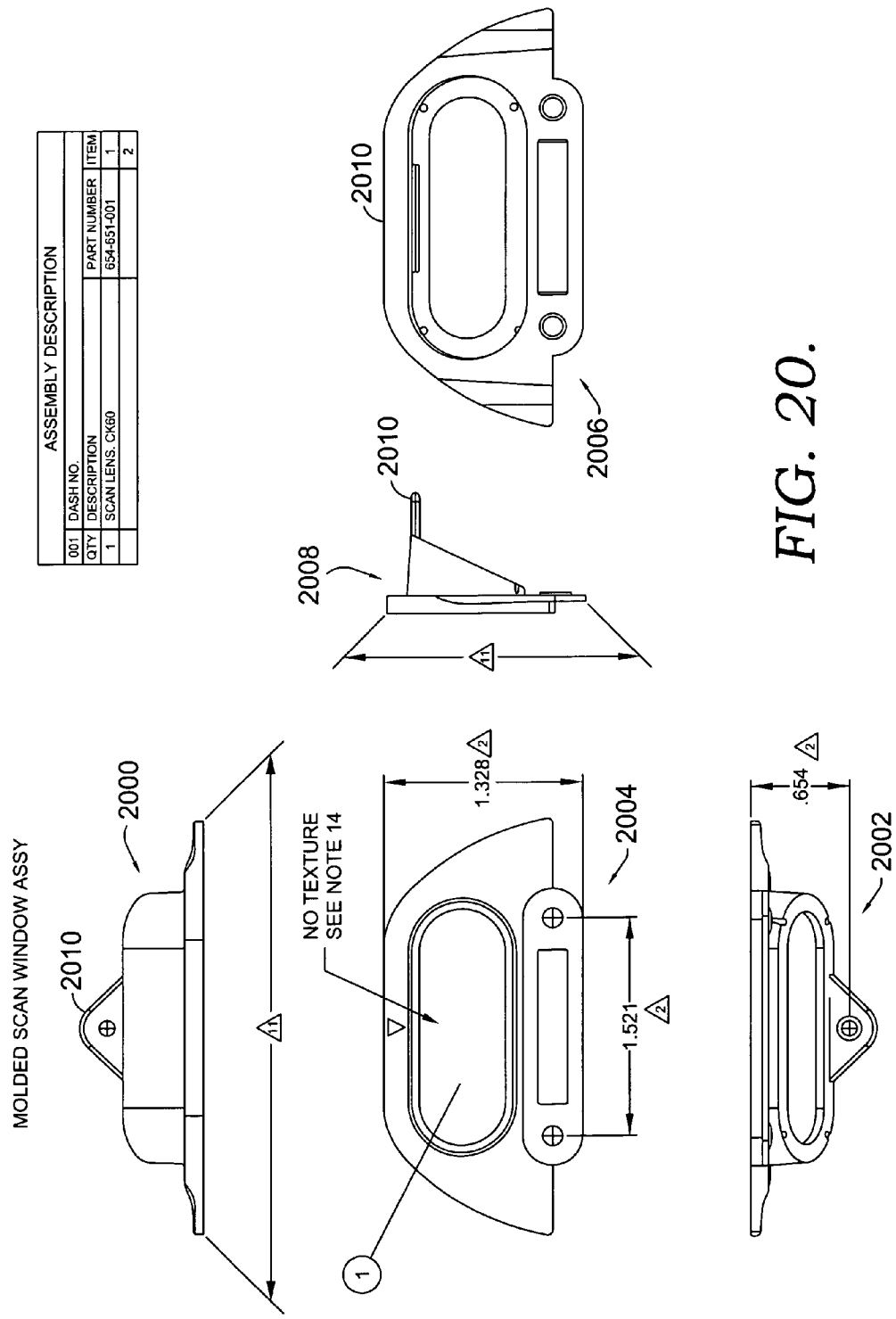
FIG. 20 depicts top, bottom, front, back and side views of a versatile window assembly for a device having an optical scanner.
Figure 22:
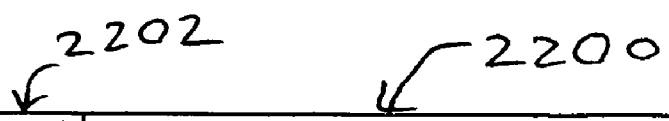
FIG. 22 depicts a listing 2200 of several of the parts depicted in FIG. 21 and relating the listing to FIG. 21 via the designated item numbers 2202.

FIGS. 19 and 20 depict embodiments of a versatile reading window system 6, 34, FIG. 4 for a computerized device having an optical indicia reader. FIG. 19 depicts top 1900, bottom 1902, front 1904, back 1906 and side 1908 views of a window assembly for a device having an optical area imager. FIG. 20 depicts top 2000, bottom 2002, front 2004, back 2006 and side 2008 views of a window assembly for a device having an optical scanner. The system of FIG. 20 is very similar to the system of FIG. 19. The differences in FIGS. 19 and 20 accommodate the differences between the optical reader engines (such as 43, FIG. 4) with which they will be used.

The system includes a reading window support structure 34, FIG. 4; 1, FIG. 19; 1, FIG. 20, including a reading window and a tab 1910, FIG. 19; 2010, FIG. 20. In one embodiment, an SD door 6, FIG. 4 can also be mounted to the support structure. The tab 1910, FIG. 19; 2010, FIG. 20 extends into the bottom housing and helps to secure the support structure to the housing. The SD door 6, FIG. 4 can be attached to the support structure by two or more screws or by other suitable attachment methods. In the depicted embodiment, the SD door 6, FIG. 4 screws also extend into the bottom housing whereby they also help secure the support structure to the housing. The support structure is further attached to the housing with one 38, FIG. 4 or more additional screws (or other suitable devices) which extend through tab 1910, FIG. 19; 2010, FIG. 20 and into the bottom housing.

One advantage of the depicted window system is that it can be assembled and the area sealed without the use of an adhesive. Environmental factors such as temperature changes can degrade adhesives. Thus, having an adhesiveless window system or a system that minimizes the use of adhesives can help prevent future leaks or failures. If tolerances and conditions require, however, an adhesive can also be used, in addition to the above-described screws, to seal the window system to the housing.

Additionally advantageous, the depicted window system is removable and replaceable. Thus, the unit can be readily modified to accept a variety of different reading engines. Further still, if the window becomes scratched or otherwise damaged, or if other portions of the window system are damaged, they can be readily replaced.

Processor and Memory

Figure 25A:
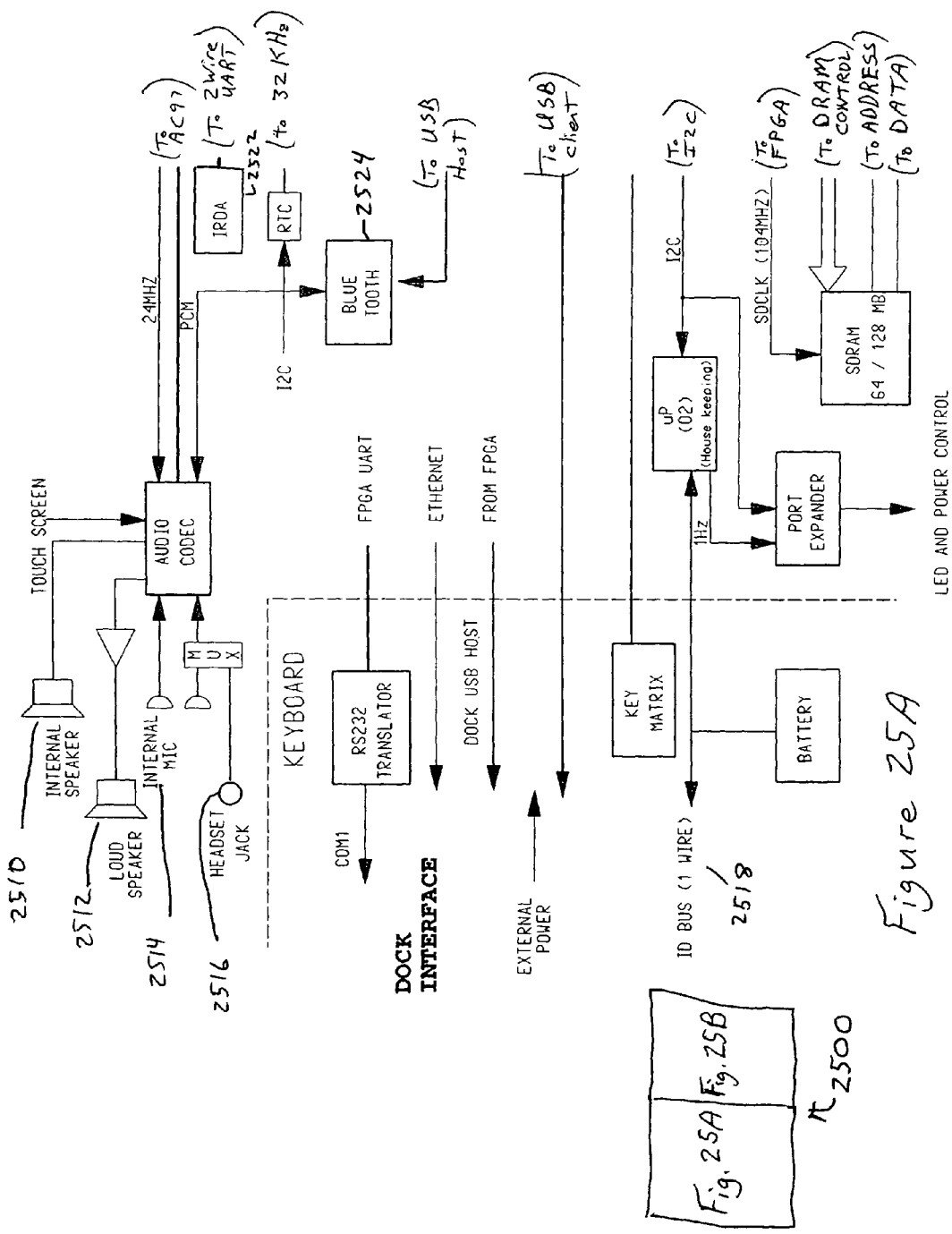

The processor for the computerized devices described herein can be any of a wide variety of processors suitable for the task at hand. For example, in one embodiment, the processor is an Intel XScale PXA272 Processor having internal flash memory and operating at 520 MHz. The operating system can be any type of system that is well suited for small, battery-powered computerized devices. For example, the MICROSOFT WINDOWS CE 5.0 or the MICROSOFT WINDOWS MOBILE software for POCKET PC. One embodiment relating the processor 2501, FIG. 25B, memory and several of the various other components described throughout this specification is depicted in FIGS. 25A and 25B.

The memory components of the computerized devices described herein can include various combinations of RAM, ROM (see flash memory associated with processor) and non-removable, non-volatile storage media (for example, Disk-on-Chip (DOC) non-volatile storage. All three memory types can be included in the same computerized device if desired. For example, an enhanced configuration of the computerized device can include 64 MB of Flash ROM, 128 MB of RAM and 128 MB of DOC. A more economical version of the device, however, can include 64 MB of Flash ROM, 64 MB of RAM and 0 MB of DOC. A wide variety of other configurations can also be offered.

Visual Display System

The computerized devices described herein can include a visual display system for displaying information to the user and for receiving stylus input. The display screen 116, FIG. 1; 2, 21, FIG. 2; 10, FIG. 21; 2502, FIG. 25B can be color or gray-scale. For example, a QVGA transflective TFT-LCD color display measuring (diagonally) approximately 4 inches and having a 240×320 pixel array capable of display 65K colors can be used. A backlight (for example, an LED backlight) can be included as well. The stylus input component can be, for example, an overlayed resistive touch panel.

The stylus can be stored on the computerized device in one or more of a variety of ways. In one embodiment, it is stored between two corner bumpers (see 1, FIG. 6). Each bumper can have a small indent. One end of the stylus can be inserted into each bumper indent and the stylus is securely and conveniently carried between the bumpers until it is needed. If every bumper includes the stylus indent, the stylus can be stored between the top or the bottom (or the left or the right side) pairs of bumpers as the user desires or as the application at hand dictates. In a related embodiment, two or more stylus components can be carried with the computerized device at the same time. In yet another embodiment, if the bumpers are sufficiently flexible and the stylus is of the proper length, the stylus can be held between two bumpers without the use of any preformed indents.

A user-selectable automatic ambient light control can also be included. The computerized device can contain a temperature sensor. In an alternative embodiment, the temperature information can be input by a user. The performance of a display can vary with temperature. Readings obtained from the temperature sensor, or user input, are used to adjust the intensity of the display backlighting. Thus, when the device is in an environment with a higher temperature, the intensity of the backlight can be decreased. Conversely, when the device is in a colder environment, the backlight intensity can be increased. As a result, good display performance can be obtained in various temperatures and even when the device is moved from one environment to a warmer or cooler environment.

Further still, the computerized device can also have an application or user-activated power saving mode wherein the display is turned off, but other processing proceeds normally. In several situations an active display screen is not needed. For example, if the device is being used as a hand-held telephone, the display can be deactivated while it is being held to a user's ear. Also, if the computerized device is just sending or receiving information (for example, uploading or downloading data or applications via one of its radios or wired connections), the display can be turned off.

Figure 24:
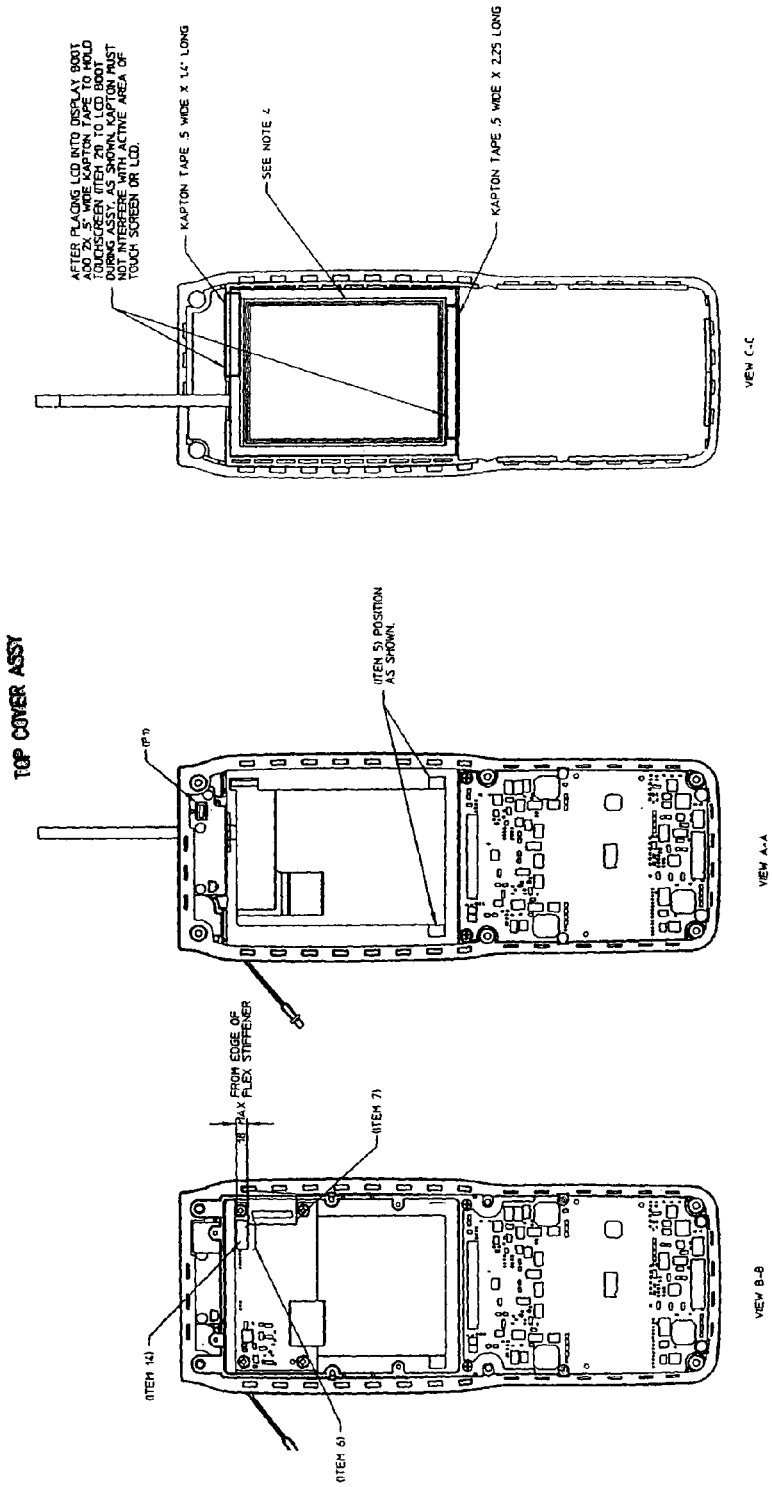
FIG. 24 depicts assembly of display and touch screen with a shock mount display boot (also see 8, FIG. 2) and the top cover sub-assembly of the computerized device

FIG. 24 depicts assembly of display and touch screen with a shock mount display boot (also see 8, FIG. 2) and the top cover sub-assembly of the computerized device. View C-C shows the placement of the display into the shock mount display boot. View A-A shows the placement of the ground pads on the back side of the display. View B-B shows the placement of the shock mount support frame (also see 8, FIG. 2) and display board on the back side of the display. Note that the computerized device can have an integrated main gasket and display boot (see 8, FIG. 2). Thus, one component 8, FIG. 2, can supply shock protection, display mounting and sealing for the computerized device.

Keyed Data Entry Component

The computerized devices described herein can also include a keypad component having a variety of features. For example, the structure underlying the keys is unique. The keypad is designed to facilitate the design and testing of new and custom keypads for the computerized device. As shown in FIG. 2, the keyboard structure has two groups 11, 16 FIG. 2, each group can be composed of two or more layers. The bottom group of layers (layers that are usually not visible to the user) 11, FIG. 2, remains the same for all configurations of the computerized device. The bottom group of layers includes the circuitry for the keypad and, for example, establishes a matrix of input areas that are responsive to a keypress.

Figure 2A:
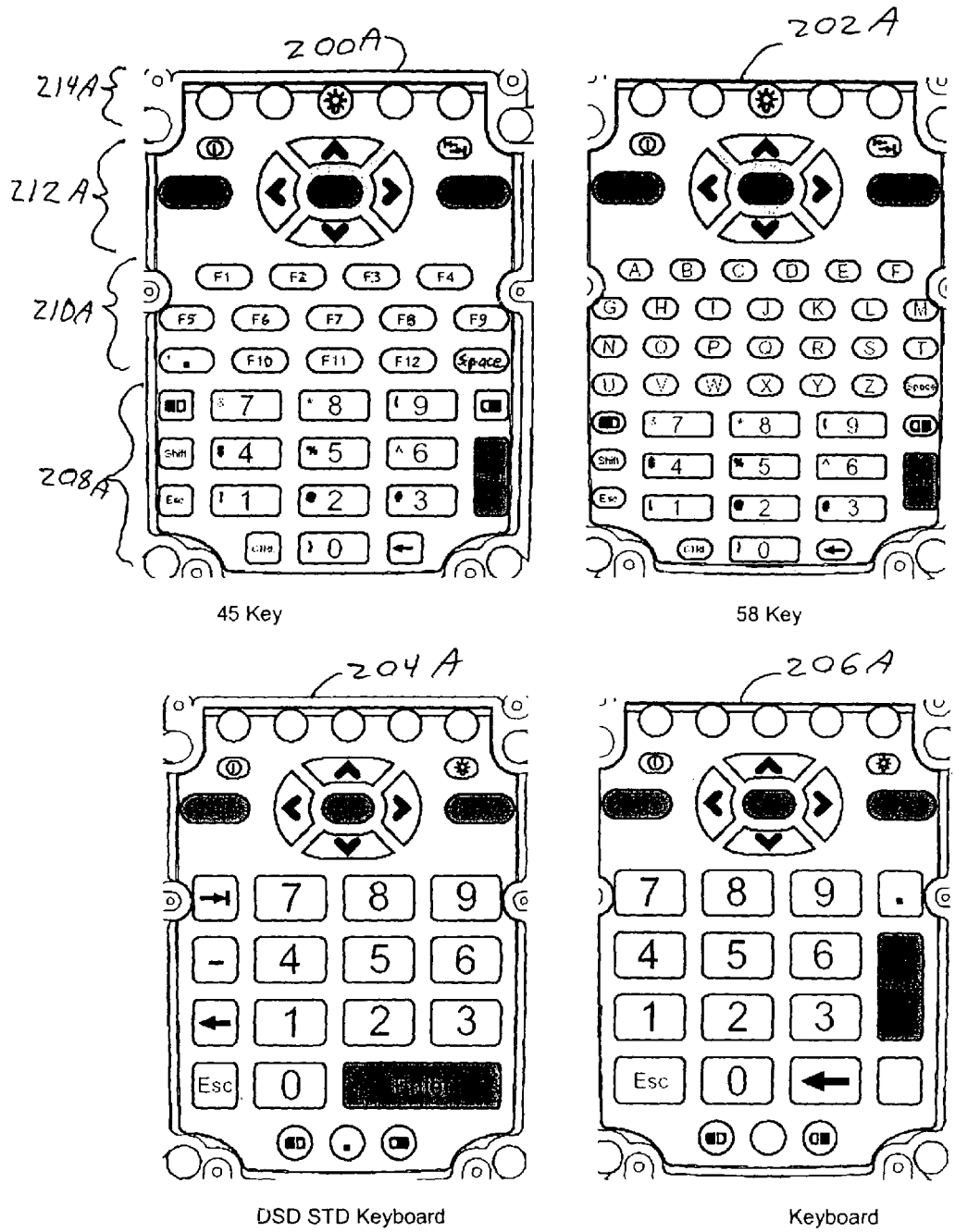
FIG. 2A depicts four different keypads as examples of keypads that can be created using the keypad customization invention described herein.
Figure 3:
FIG. 3 depicts a listing 300 of several of the parts depicted in FIG. 2 and relating the listing to FIG. 2 via the designated item numbers 302.

The top group of layers 16, FIG. 2, however, is replaceable. Thus, when a new or custom keyboard is designed, only the top group of layers need be designed and tested. The top layers include, for example, a layer that exposes those areas of the matrix of input areas that will be used as keys in the particular keypad layout being designed. The upper layer also includes a keypad overlay that is customized, for example with the appropriate labels, graphics and symbols, etc., for the particular keypad. FIG. 2A depicts four examples 200A, 202A, 204A, 206A, FIG. 2 of keypads, any one of which can be provided to a user via the customizable top group of layers. Other arrangements are also possible.

The topmost keypad layer, one that is visible to the user, can contain several different groups of keys. For example, in FIG. 2A at least four different regions are presented in a 45 key keypad. One region 208A, FIG. 2A, for example, includes numeric, shift, esc, ctrl, enter, backspace and related keys. A second region 210A, FIG. 2A contains a collection of function keys. A third region 212A, FIG. 2A contains cursor control, scan/read trigger button and programmable keys. The programmable keys can be set-up, by a user or by an application, to control a radio feature, a digital camera, an optical indicia reader, a GPS module, etc. (In addition to the trigger positioned on the keypad, an optical indicia reader trigger button is located on the left and right side surfaces of the computerized device.) A fourth region 214A, FIG. 2A contains five control keys. The five control keys can be user-defined function keys (F1-F4). The control keys can be used, for example, for facilitating user adjustment of volume and/or of display light intensity, to call up a menu, etc.

FIG. 2A also presents three other keypads 202A, 204A, 206A, FIG. 2A that can be obtained by using appropriately designed top layers as discussed above. Note that two of these three keypads 204A, 206A, FIG. 2A contain just three key regions. A wide variety of other keypad arrangements are also possible. Thus, the computerized can be readily customized to meet the needs of a wide range of applications.

As shown in FIG. 2A, some regions of the keypad can be kept the same for all of the various configurations of the keypad. This can aid in product recognition since all configurations of the computerized device will appear similar in at least some respects. It can also be used to enhance or simplify the design and construction of the overall device. For example, in FIG. 2A, the top two keypad regions 212A, 214A, FIG. 2A are identical. In other, embodiments of the keypad invention, no region, one region or three regions, etc, may be kept constant throughout the various keypad configurations.

The individual keys can be hard keys over an elastomeric substrate. If desired, the keys can be backlit for use in darker environments. The keypad can use tactile, high-travel keypad technology. Special keys can include: Push to Talk, Recorder/Speech Entry, Send Key, End Key, Camera Button, Scan Button, cursor navigation controls, shift planes, Alt, Ctrl, Alpha, Shift, Caps-Lock, SYM key for international characters, Volume Up, Volume Down, Right Soft/Programmable Key, Left Soft/Programmable Key, Smart Minimize (ok button), Windows Key, and/or Menu Button.

Status Indicators

The computerized devices described herein can employ several different status indicators. The indicators include a Good Scan/Read indicator, a User Notification indicator (for example, a Microsoft Event Notification indicator), a tri-color Battery Status indicator, a Keypad Dependent indicator (for example, Alpha Lock), a Vibrator and a System Readiness indicator (a "System Light"). Optical (light-emitting) status indicators can be located between or on keys in the keypad or at other locations on the housing. The status indicators for a given device configuration can be selected to meet the anticipated needs of that particular configuration of the device. For example, the customizable keypad inventions described above can be used to present or to hide various indicators on the surface of the device. Further, status indicators can be disabled by software or hardware if desired. For example, the vibrator or other status indicators can be controlled by various application programs via an application program interface (API).

A tri-color battery status indicator can be used, for example, to show various battery states. The amount of information communicated by this indicator can be increased by operating the indicator at different colors and at different rates of flash (for example, steady on, slowly flashing a color on and off, quickly flashing a color off and on, or flashing two or more different colors in a certain sequence, etc.). For example, the tri-color indicator can be used to communicate four different states as follows: Low Battery State (for example, flash a red color), Battery Charge Complete State (steady green), Battery Charging State (steady red), and Check Battery State (steady amber). Many other such schemes are possible.

Audio System

The audio system of the computerized devices described herein can contain two speakers 2510, 2512, FIG. 25A, each on a separate audio path, a microphone 2514, FIG. 25A and a headset jack 2516, FIG. 25A. The multi-speaker system can be used in a variety of useful ways. The two speakers can be located on different surfaces of the computerized device. In addition, the two speakers can be of different types and power. In some applications it is advantageous to use both speakers simultaneously. In other applications it is advantageous to use just one speaker or the other. Further, each speaker can have its own volume control.

For example, one speaker (see 8, FIG. 13) can be located on the side of the computerized device that is opposite a surface presenting a user interface (for example a keypad, touch screen or display, etc.). The second speaker can be located on a different surface of the device. For example, the second speaker could be located on the side containing the user interface (see 7, FIG. 21). In addition, the second speaker can be located so that it will be near a user's ear when an integrated microphone of the device is positioned next to a user's mouth.

In one embodiment, one of the speakers is a loudspeaker 8, FIG. 13; 2512, FIG. 25A, and the other speaker is a lower-power telephone type of speaker 7, FIG. 21; 2510, FIG. 25A. When the computerized device senses, or is told, that it is body-mounted or docked, for example, it can by default route all audio to the loudspeaker. When it is being hand-held and is being used in a telephone application or to output audio information to a user, it can be set up to route the audio output to the lower-power speaker. When it is desired to use the computerized device in a speaker-phone application, the telephone audio can be routed to the loudspeaker instead of, or in addition to, the lower-power speaker. The choice of speaker can be made by the user, it can be set by the application communicating the audio, or it can be chosen automatically by a routine residing in the computerized device.

Further, the use of two speakers, and their placement, can also enhance the safety of the computerized device. For example, the loudspeaker 8, FIG. 13 can be located in an area of the computerized device that also houses radio frequency antennas. The smaller, lower-power speaker 7, FIG. 21, which will in some applications be held near a user's ear, can be located away from the area containing the antennas. Further, the antennas can be designed and directed to radiate their electromagnetic radiation away from the area housing the lower-powered speaker. Such an arrangement will help to minimize the exposure of a user to antenna radiation when holding the computerized device with the lower-powered speaker near the ear and head. This also makes it easier for the device to pass electromagnetic radiation testing requirements (such as SAR testing for example).

The two speakers can have any of a wide variety of characteristics. By way of further example, however, one speaker (the high volume speaker) can be a speaker having a maximum 80 dB volume when measured at a distance of 40 cm above the speaker at 1 KHz. It can be used, among other things, to reproduce voice and WAV type files. Such a speaker can be used for many things, including the conveyance of status tones (for example, warning tones, alert tones, good read beeps, etc.). The other speaker (which may be located on the front or keypad side of the computerized device) can be a speaker having a maximum 80 dB volume, measured at 1 cm, and a range of 800-8000 Hz at +/−6 dB. It can be a full voice range speaker of a cellular telephone type quality. Such a speaker can be used for many things, including cell phone, message playback, and other applications.

The microphone 2514, FIG. 25A can be positioned (see 5, FIG. 21 for example) on the computerized device for operation at arm's length in one mode of operation. It is also positioned, however, to facilitate use as a mobile phone held to the head. The microphone can be used to support voice communications and speech recognition applications. For example, it can be used to input control commands to the computerized device which may otherwise be entered via keypad or cursor manipulation (for example, to trigger reading, dim display, launch an application, etc., etc.).

A headphone and headset jack is also included 2516, FIG. 25A. The jack can be located on the end having the docking connector, for example, or at some other suitable location on the housing. The speakers can be configured to be muted when a headset or headphone is present. Further, the microphone can be configured to be automatically muted when a headset is attached. In addition, a Bluetooth enabled headset, instead of a wired headset, can be used with the computerized device.

Power System

The computerized devices described herein can be powered from an integrated, rechargeable battery pack 9, FIG. 6. The battery pack includes an electronically readable identification component. For example, it can be compatible with the one-wire bus system described herein. Further, the computerized device can distinguish the battery pack from other similarly shaped battery packs. For example, the computerized device can be configured to not accept operating power from a coupled battery pack unless it first senses that the inserted battery pack is of an appropriate type. This will help prevent damage to the computerized device from the insertion of an incompatible battery pack. This protection can be achieved, for example, by using the component identification system that is described in further detail below.

Docking Connector

A docking connector (see 7, FIG. 13) can also be included on the computerized devices described herein. The docking connector provides wired connections to other devices and networks. The connector permits blind insertion of the computerized device into a dock. The connector also provides a mechanism allowing attachment of cables to tethered peripheral devices. The mechanism can be designed to support a cable pull force of, for example, 20 to 40 pounds.

The docking connector can include, for example, a 24 pin connector. The 24 pin connector can then provide seven wire RS232, USB Host, USB Client, Ethernet, Power In and Power Out connections to the computerized device. The docking connector can be positioned on an end of the computerized terminal that is designed for insertion into a dock. In the depicted computerized device, the docking connector is located on the heel surface to the device.

Optical Indicia Reader

The computerized devices described herein also can include an optical indicia reader (see 43, FIG. 4 for example). The optical indicia reader 2504, 2506 can be, for example, a 2D Area Imager or a 1D & PDF417 Linear Imager or scanner. The reader supports all popular 1D and 2D symbologies, stacked codes and signature capture. Examples of some supported codes include Code 39, I 2 of 5, S 2 of 5, Matrix 2 of 5, Code 128, Code 93, Code 93i, Codabar, Codablock, MSI, Plessey, UPC, EAN/EAN128, ISBT128, Code 11, RSS, Telepen, PDF417, Micro PDF417, Macro PDF417, Maxicode, Datamatrix, QR Code (2D symbologies require an Area Imager).

The optical indicia reader (such as 43, FIG. 4) can be mounted in a mounting bracket 35, FIG. 4 as depicted in FIG. 4. A window assembly 34, FIG. 4; FIG. 19; FIG. 20 is secured to the bottom housing in front of the optical indicia reading engine 43, FIG. 4. The reader can be triggered via a keypad button or via one of the two side-mounted (see 400, FIG. 4) trigger buttons.

Figure 23:
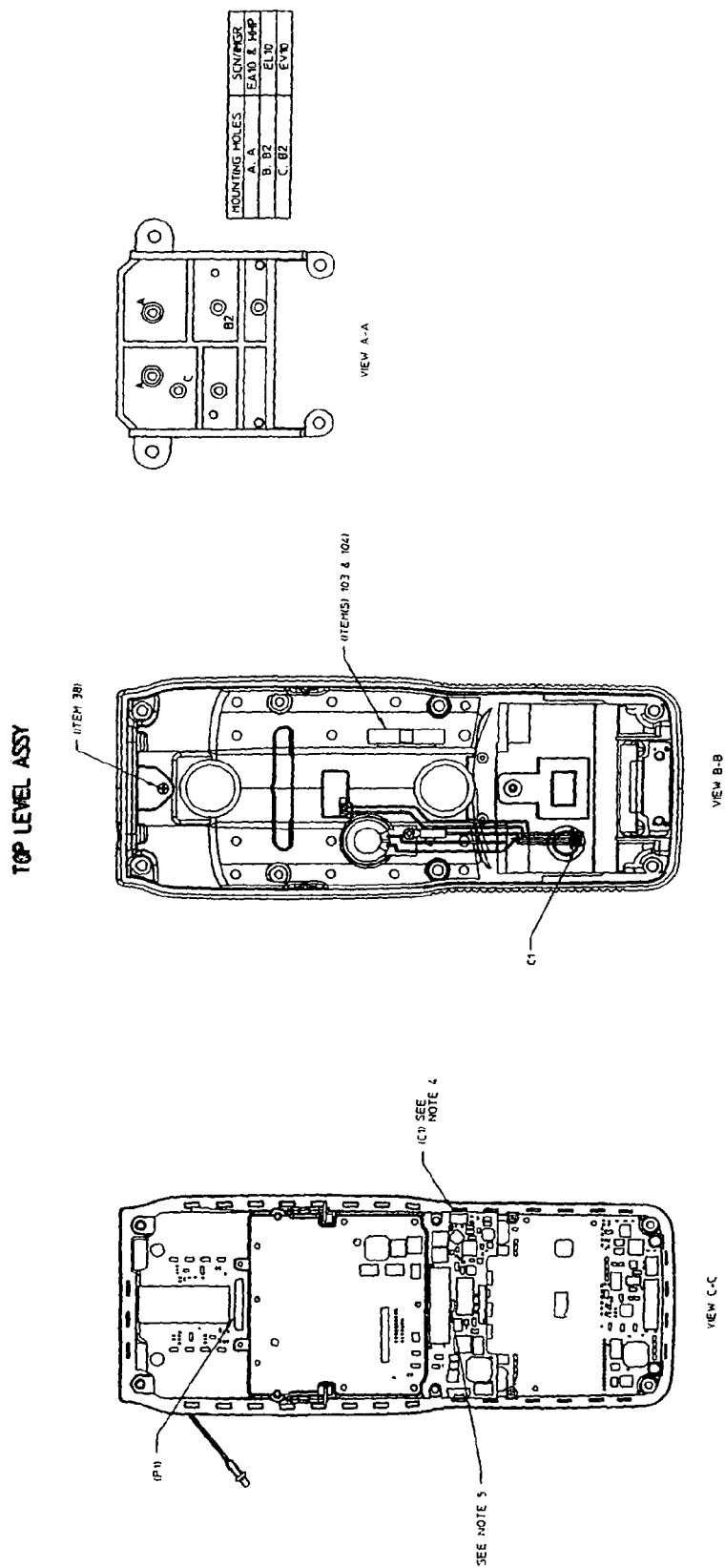
FIG. 23 depicts a reader engine mounting bracket (view A-A) and its placement relative to the top sub-assembly (view C-C) and the bottom subassembly (view B-B).

FIG. 23 depicts a reader engine mounting bracket (view A-A) and its placement relative to the top sub-assembly (view C-C) and the bottom subassembly (view B-B). View A-A is a bracket capable of mounting multiple different scanners or optical readers with different mounting hole locations. The table shows which holes go to each reading engine. The bracket mounts to the board shown in view C-C and is covered by the back case shown in view B-B.

Digital Camera

The computerized devices described herein can also include a digital camera 2508, FIG. 25B which can be a color camera. The camera and its related interface board can be located, for example, on the back or bottom side of the device. A larger bottom housing can be used to provide the additional space required for camera components. Thus, it is possible for the computerized device to house both an optical indicia reader and a digital camera.

Global Positioning System (GPS) Capability

The computerized devices described herein can also optionally include an internal GPS receiver 2520, FIG. 25B. The GPS receiver can be, for example, a 12-channel GPS module. The GPS module can be located inside the unit with an internal antenna mounted inside the housing or an external antenna mounted to the exterior of the housing. Alternatively, an internal GPS receiver can be provided via a snap-on adaptor or other type of GPS module.

IrDA Capability

The computerized devices described herein can also include an infrared (IrDA) communication capability 2522, FIG. 25A. The IrDA transceiver is located on the bottom cover of the computerized device.

Short Range Radio Communication

The computerized device can also contain a very short range radio communication transceiver 2524, FIG. 25A. For example, a currently available transceiver, known as a Bluetooth (class 1) radio or transceiver can be used. The line of sight range of the radio can be approximately 50 meters at maximum. The Bluetooth radio is located inside the computerized device and is mounted to the main logic board (MLB).

The short range radio can be used to establish wireless communication between the computerized device and a wide variety of devices. Current Bluetooth supported devices include, for example, scanners, printers, headsets (speakers and microphone), cellular telephones, Global Positioning System (GPS) devices, etc. Thus, the computerized device will be capable of communicating with, and receiving data from, a wide range of peripheral devices. The peripheral devices, for example, can be body-mounted or even vehicle mounted peripheral devices that are located within the communication range of the short range radio.

The computerized device can also be configured so that a signal from the short-range (for ex., Bluetooth) radio on the Bluetooth line will cause the computerized device to wake up from a sleep state or other lower-powered, energy-conservation state. Thus, when the computerized device is notified, for example because it is about to receive information via a Bluetooth or short range radio from a Bluetooth or other short-range enabled device, it can wake up or activate the appropriate components and receive the transmitted information or perform other tasks that may be necessary.

Wireless Local Area Network (WLAN) Radio Communication Capability

The computerized devices described herein can also contain other types of radios as well. For example, it can include an integrated IEEE 802.11b/g or 802.11a compatible radio 2526, FIG. 25B. Additional details on these radios can be found, for example, in the Appendices that accompany this disclosure. The WLAN radio is located on a module board in the computerized device (see 58, FIG. 4 for example).

Wireless Wide Area Network (WWAN) Radio Communication Capability

In addition to the WLAN radio, the computerized devices described herein can also include a WWAN radio 2528, FIG. 25B. The WWAN radio can be, for example, a CDMA or GPRS type of radio. Additional information on the CDMA and GPRS radios can be found, for example, in the accompanying appendices and figures. The WWAN is located on a module board and its antenna is located internally at the top end of the unit near the optical indicia reader (see 51, FIG. 4).

Further, any combination of the WWAN, WLAN, very short range (Bluetooth) and GPS radios can coexist in a single computerized device. For example, any one, two, three or even all four of these different radios can be present in the same computerized device. Thus, many different configurations of the computerized device can be created. Further still, the four radios can also coexist with an optical indicia reader, a digital camera and/or an IrDA transceiver. The result is very robust, versatile, portable device for data collection and communication.

Bus System for Component Identification

This invention provides an efficient and user-friendly manner of identifying the components present in a computerized device having several different potential configurations. The invention involves the inclusion of an identification module in the various components that may be included in a configuration of a system. The identification module can be included in any of the optional (or even in some non-optional) components of a configurable system (for example, in a system based upon an Intermec CK60 hand-held device). The identification module can be used to communicate information about its accompanying component (an optional or user-connectable component for example) to the unit with which it is coupled (for example, a CK60 processing system). The invention permits convenient and even frequent configuration and reconfiguration of the system without requiring time-consuming parameter setting by the user or manufacturer.

Computerized devices can have several peripheral and/or optional components that can be combined to meet the needs of an application at hand. For example, a hand-held system can include one or more styles of docking device, each dock having different features, which can be coupled with the hand-held device. Further, various body-mountable holsters, handles, cameras, imagers, scanners, RFID readers, etc. can be offered as options to a hand-held or portable device. Further still, various snap-on adaptors such as those described herein may be coupled with the computerized device. A user-friendly system is needed that can provide a device's processor system with information related to the various resident components.

The identification system enables important and useful information about the various resident components to be readily and automatically provided to the processor. The information can be used to optimize the performance of the system. Without the capability provided by the present invention, such information would not be as readily available to the system. Alternatively, the system would have to be laboriously set up and configured when making component changes.

In the present invention an identification module is added to one or more of the various components that can be included in a computerized data handling device. The identification module is designed to be automatically and communicatively coupled with a control processor of the device whenever its associated component is coupled with the system. The information stored on, and communicated by, the identification module can be tailored to meet the anticipated needs of the system or application. For example, the module may supply just a simple identifier (either descriptive or coded) to identify the nature of the component to the system. In other applications, however, substantially more information can be supplied.

In one embodiment a one-wire bus 2518, FIG. 25A, is used to couple the identification module with the processing system. One such suitable bus is manufactured by Dallas Semiconductors for example. A one-wire bus is desirable since it is an inexpensive solution that can be readily adapted to meet the needs of the invention. Alternatively, a variety of other types of buses can be used.

The identification module itself can be a simple and small computerized memory structure. Generally, the identification module includes a connector, wire, port or other suitable coupling component. Further, it should have sufficient memory to store the information it will be expected to store and communicate. If desired, the specific composition of the identification module can be a function of the component into which it will be incorporated. For example, the amount of memory can be tailored to closely match the amount of information it will be expected to store. Another alternative is to employ a "one size fits all approach" wherein identical identification modules are used in each of the changeable components of the system.

The identification module can be included in a variety of different system components. For example, it can be included with a battery, a dock, an option board, a keyboard module, a snap-on component, a body mounted holster, a handle, an imager, a camera, a scanner, a radio module, or some other user or manufacturer-removable component. For example, the identification module can be included with any one or more of the various components, snap-on adapters, or accessories described throughout this specification or the accompanying appendices. Further, in one embodiment, the identification module receives its operating power from the computing device with which it and its associated component is coupled. For example, when a one-wire bus is used as the coupling medium, operating power is delivered to the identification module via the one-wire bus.

An identification module incorporated with a battery or battery pack can be used in a variety of ways. For example, it can store information related to the date of manufacture of the battery. Such information can be used, by itself or in conjunction with other information, to determine if the battery may be due for replacement, the expected charging or discharging characteristics of the battery, the features of the battery, etc. In some applications, the information stored on the identification module can be updated or modified by a device with which it is coupled or, in certain circumstances, by the component within which the identification module is housed.

A battery-based identification module can alternatively or additionally store information concerning the capacity, source or manufacturer, or chemistry of the battery. Further, the identification module can be used to indicate whether the battery is a "safe" or a "smart" battery pack. When the battery pack is a smart pack, the features or capabilities of the battery can be indicated. In a less sophisticated application, the identification module can be used to indicate simply that a battery or battery pack is present in the system. Various combinations or subsets of the above-described information can be stored in the identification module to meet the needs of various applications.

The stored information can be used for several purposes. It can be used to support the smart battery when one is present. It can be used for "gas gauging" (to determine how much operating time is left before a recharge will be needed). Further, it can be used to determine the compatibility of the battery with the system or to help decide whether a battery is present or is malfunctioning. In addition, it can be used to set user alerts based on the indicated chemistry of the battery.

When an identification module is incorporated with a docking component, it can be used to convey information regarding the features of the dock. For example, it can indicate whether charging and/or communication options are supported. When one or both are supported, it can indicate specifics such as the type of charging supported, whether a spare battery charging capability is present and being used and/or what types of communication are supported (for ex. Ethernet, RS-232, USB, etc.). Further, the identification module can be used to indicate whether there is a printer with, or coupled with, the dock or whether the dock has a heating unit.

It can also indicate whether the dock is a multi-dock, the specifics of the multi-dock and the number of units currently coupled with the multi-dock.

When an identification module is located with an option board, a keyboard module, an imager, a camera, a scanner, an RFID reader, or a radio module, it can store information or information sets describing the specifics of that component. For example, it can indicate the manufacturer, date of manufacture, drivers, date of last update, included chips or other components, specifications (for example, operational temperature range, operating speeds, part number, etc.), the anticipated lifetime of the associated component, the type of option(s) provided by an option board, the number or type of keys included if a keyboard, the optical specifications or reading rates, ranges and methods if an optical component, the storage capacity and type if an RFID module, and the radio specifications if it is associated with a radio module. Similar information can be included with an identification module that is associated with a snap-on or other such component.

When accompanying a body-mounted or other such holster or holder, the identification module can store information such as that described in the preceding paragraph. The information can be used in a variety of ways. If the device coupled with the holder or holster knows that that it is so situated, the device may act to enable or disable appropriate features. For example, the keyboard, display, telephone, and/or optical or RF reading component can be turned off or put into a reduced power or sleep mode. The volume of an alert tone or tones can be increased. A microphone can be activated or configured to receive potential voice commands or to facilitate speakerphone-type operation. Further, a loudspeaker can be activated or its volume can be increased. The adjustments made to microphone sensitivity or speaker volume can be based on the expected location of the holster or holder relative to a user's mouth or ear. For example, settings may differ depending on whether the identification module indicates a belt-mounted, arm-mounted, head-mounted, torso-mounted, pocket-mounted, wall-mounted or table-mounted, etc., holster or holder.

Finally, when an identification module indicates that it is part of a device handle or hand-grip of some sort, the coupled device can make additional adjustments or modifications. For example, the identification module may indicate that the handle contains its own battery. In such a circumstance, the device may choose not to supply operating power to components located with the handle or handgrip. Further, the device may choose to charge, or to be charged from, the handle or handgrip's battery. Other information related to a handle's battery (as described above) or to other components provided by a handle can also be stored in the identification module.

Additionally, based on information received from the identification module, the computerized device may choose to reconfigure one or more keyboard keys or other keys, buttons or triggers. Some keys could be set to activate or deactivate components of the handle or handgrip. For example, a key or button on the computerized device could be used to activate an RFID reader or optical reader component located in a handle. Further, if a handle or handgrip interferes with one or more device keys in some way, those keys can be deactivated. In addition, communication with handle based inputs, keys, triggers or buttons can be established and monitored.

It will be apparent to one of ordinary skill in the art that the details presented above are beyond what is necessary to practice the present invention. It is thought that the method and apparatus of the present invention will be understood from the preceding description and the appended claims, and that it will be apparent that various changes may be made in the form, construct steps and arrangement of the parts and steps thereof, without departing from the spirit and scope of the invention and without sacrificing the material advantages thereof.

As is evident from the description provided above, the implementation of the present invention varies greatly depending on the circumstances surrounding the implementation. Many variations, implementations and combinations are envisioned and disclosed. The scope of the present invention is intended to cover all variations, omissions, substitutions and combinations which are and which may become apparent from the disclosed embodiments. The scope of the invention should be extended to the claimed invention and all of its equivalents.

What is claimed is:

1. A component identification system for a data-handling system, comprising:
    a portable data-handling unit, comprising a processing unit;
    a data-handling system component;
    a component identification module that is a part of a component in the portable data-handling unit and identifies the component present in the portable data-handling unit, the component identification module located with said data-handling system component, comprising a non-volatile memory storing information identifying at least one attribute of the data-handling system component with which it is located;
    a power storage component;
    a communication control component that causes said processing unit to wake-up from a sleeping state or other energy conservation state and activate an appropriate component based on information received from a short-range radio; and
    a one-wire bus, coupled with said processing unit and with said component identification module;
    wherein said processing unit causes operating power to be transferred to said component identification module via said one-wire bus, wherein said component identification module then communicates information stored in said non-volatile memory to said processing unit via said one-wire bus, and wherein the portable data-handling unit distinguishes one power storage component from another power storage component.

2. The component identification system of claim 1, wherein the component identification module includes at least one of a connector, a wire, and a port.

3. The component identification system of claim 1, wherein the component identification module stores information related to a manufacture of the power storage component.

4. The component identification system of claim 1, wherein the component identification module includes the power storage component.

5. The component identification system of claim 1, wherein the data-handling system component is selected from a group consisting of a global positioning receiver, a wireless local area network (WLAN) radio, a wireless wire area network (WWAN) radio, a very short range radio, a digital camera, and a optical indicia reader.

* * * * *